(12) United States Patent
Warrington et al.

(10) Patent No.: US 11,165,085 B2
(45) Date of Patent: Nov. 2, 2021

(54) HIGH-THROUGHPUT MANUFACTURING PROCESSES FOR MAKING ELECTROCHEMICAL UNIT CELLS AND ELECTROCHEMICAL UNIT CELLS PRODUCED USING THE SAME

(71) Applicant: Lockheed Martin Energy, LLC, Bethesda, MD (US)

(72) Inventors: Curtis Warrington, Acton, MA (US); Thomas H. Madden, Glastonbury, CT (US); Srivatsava Puranam, Cambridge, MA (US)

(73) Assignee: Lockheed Martin Energy, LLC, Bethesda, MD (US)

(*) Notice: Subject to any disclaimer, the term of this patent is extended or adjusted under 35 U.S.C. 154(b) by 0 days.

(21) Appl. No.: 16/451,765

(22) Filed: Jun. 25, 2019

(65) Prior Publication Data
US 2019/0319292 A1 Oct. 17, 2019

Related U.S. Application Data

(62) Division of application No. 15/093,598, filed on Apr. 7, 2016, now Pat. No. 10,381,674.

(51) Int. Cl.
*H01M 8/2404* (2016.01)
*H01M 8/18* (2006.01)
(Continued)

(52) U.S. Cl.
CPC ....... *H01M 8/2404* (2016.02); *H01M 8/0273* (2013.01); *H01M 8/0286* (2013.01);
(Continued)

(58) Field of Classification Search
CPC ........... H01M 2/36; H01M 2/38; H01M 10/02
See application file for complete search history.

(56) References Cited

U.S. PATENT DOCUMENTS

| 3,779,813 A | 12/1973 | Rabut |
| 4,075,401 A | 2/1978 | Miyagawa |

(Continued)

FOREIGN PATENT DOCUMENTS

| CN | 1555584 A | 12/2004 |
| CN | 103187551 A | 7/2013 |

(Continued)

OTHER PUBLICATIONS

Japanese Office Action from 2016-544047, dated Jul. 3, 2018, 11 pages.

(Continued)

*Primary Examiner* — Osei Kamponsah
(74) *Attorney, Agent, or Firm* — BakerHostetler

(57) ABSTRACT

Flow batteries can be constructed by combining multiple electrochemical unit cells together with one another in a cell stack. High-throughput processes for fabricating electrochemical unit cells can include providing materials from rolled sources for forming a soft goods assembly and a hard goods assembly, supplying the materials to a production line, and forming an electrochemical unit cell having a bipolar plate disposed on opposite sides of a separator. The electrochemical unit cells can have configurations such that bipolar plates are shared between adjacent electrochemical unit cells in a cell stack, or such that bipolar plates between adjacent electrochemical unit cells are abutted together with one another in a cell stack.

14 Claims, 14 Drawing Sheets

(51) Int. Cl.
*H01M 8/0286* (2016.01)
*H01M 8/0273* (2016.01)
*H01M 4/86* (2006.01)

(52) U.S. Cl.
CPC .... *H01M 8/188* (2013.01); *H01M 2004/8694* (2013.01); *Y02E 60/50* (2013.01); *Y02P 70/50* (2015.11)

(56) References Cited

U.S. PATENT DOCUMENTS

| | | | |
|---|---|---|---|
| 4,532,193 A | 7/1985 | Kniazzeh et al. | |
| 4,735,872 A | 4/1988 | Maimoni | |
| 4,902,589 A | 2/1990 | Dahn et al. | |
| 4,948,681 A | 8/1990 | Zagrodnik et al. | |
| 5,188,911 A | 2/1993 | Downing et al. | |
| 5,618,641 A | 4/1997 | Arias | |
| 5,637,416 A | 6/1997 | Yoshii et al. | |
| 5,665,212 A | 9/1997 | Zhong et al. | |
| 6,296,746 B1 | 10/2001 | Broman et al. | |
| 7,229,564 B2 | 6/2007 | Liu et al. | |
| 8,268,475 B2 | 9/2012 | Tucholski | |
| 8,268,511 B2 | 9/2012 | Mekala et al. | |
| 9,443,782 B1 | 9/2016 | Steimle et al. | |
| 2003/0087141 A1 | 5/2003 | Sun et al. | |
| 2003/0087156 A1 | 5/2003 | Broman et al. | |
| 2003/0099884 A1 | 5/2003 | Chiang et al. | |
| 2004/0131916 A1 | 7/2004 | Hodge et al. | |
| 2004/0191623 A1 | 9/2004 | Kubata et al. | |
| 2004/0224190 A1 | 11/2004 | Sasahara et al. | |
| 2004/0233616 A1 | 11/2004 | Arai et al. | |
| 2004/0241525 A1 | 12/2004 | Mekala et al. | |
| 2005/0098435 A1 | 5/2005 | Jacobson et al. | |
| 2005/0158615 A1 | 7/2005 | Samuel et al. | |
| 2005/0260473 A1 | 11/2005 | Wang | |
| 2006/0068265 A1 | 3/2006 | Hanlon et al. | |
| 2007/0037037 A1 | 2/2007 | Nguyen et al. | |
| 2007/0054175 A1 | 3/2007 | Maendle et al. | |
| 2007/0125493 A1 | 6/2007 | Jang et al. | |
| 2007/0227654 A1 | 10/2007 | Liu et al. | |
| 2007/0287047 A1 | 12/2007 | Kaiser et al. | |
| 2008/0038622 A1 | 2/2008 | Valensa et al. | |
| 2008/0142152 A1 | 6/2008 | Debe et al. | |
| 2008/0152839 A1 | 6/2008 | Han et al. | |
| 2008/0291027 A1 | 11/2008 | Lake | |
| 2008/0305385 A1 | 12/2008 | Smiljanich et al. | |
| 2008/0318110 A1 | 12/2008 | Budinski et al. | |
| 2010/0003545 A1 | 1/2010 | Horne et al. | |
| 2010/0047650 A1 | 2/2010 | Iino et al. | |
| 2010/0291442 A1 | 11/2010 | Wang et al. | |
| 2011/0223450 A1* | 9/2011 | Horne ................ | B60L 50/64 429/72 |
| 2011/0244277 A1 | 10/2011 | Gordon et al. | |
| 2012/0040254 A1 | 2/2012 | Amendola et al. | |
| 2012/0258345 A1 | 10/2012 | Laffou et al. | |
| 2013/0037760 A1 | 2/2013 | Maeda et al. | |
| 2013/0071714 A1 | 3/2013 | Perry et al. | |
| 2013/0095361 A1 | 4/2013 | Sinsabaugh et al. | |
| 2013/0157097 A1 | 6/2013 | Kampanatsanyakorn et al. | |
| 2013/0266829 A1 | 10/2013 | Cole et al. | |
| 2014/0051007 A1 | 2/2014 | Blanchet et al. | |
| 2014/0234734 A1 | 8/2014 | Tsutsumi et al. | |
| 2014/0308594 A1 | 10/2014 | Dudney et al. | |
| 2014/0349147 A1 | 11/2014 | Shaffer, II et al. | |
| 2014/0370404 A1 | 12/2014 | Kato et al. | |
| 2015/0079493 A1 | 3/2015 | Guthrie | |
| 2015/0099199 A1 | 4/2015 | Bazant et al. | |
| 2015/0136301 A1 | 5/2015 | Cyman, Jr. et al. | |
| 2016/0020477 A1 | 1/2016 | Smeltz et al. | |
| 2016/0036060 A1 | 2/2016 | Brezovec et al. | |
| 2016/0240868 A1 | 8/2016 | Warrington et al. | |
| 2016/0308224 A1 | 10/2016 | Morris-Cohen et al. | |
| 2017/0054164 A1 | 2/2017 | Goeltz et al. | |

FOREIGN PATENT DOCUMENTS

| | | |
|---|---|---|
| CN | 103579658 A | 2/2014 |
| CN | 203733887 U | 7/2014 |
| CN | 104795577 A | 7/2015 |
| DE | 102011120802 A1 | 6/2013 |
| JP | H06290795 A | 10/1994 |
| JP | H087913 A | 1/1996 |
| JP | 2001283879 A | 10/2001 |
| JP | 2005228633 A | 8/2005 |
| JP | 2008047313 A | 2/2008 |
| JP | 2008078104 A | 4/2008 |
| JP | 2008091110 A | 4/2008 |
| JP | 2008166260 A | 7/2008 |
| JP | 2011228059 A | 11/2011 |
| JP | 2012252955 A | 12/2012 |
| JP | 2014520382 A | 8/2014 |
| JP | 2015-215948 A | 12/2015 |
| KR | 2015-0007750 A | 1/2015 |
| WO | 0016418 A1 | 3/2000 |
| WO | WO 2003/026042 A1 | 3/2003 |
| WO | 008073679 A1 | 6/2008 |
| WO | 2010033118 A1 | 3/2010 |
| WO | 2012177255 A1 | 12/2012 |

OTHER PUBLICATIONS

Extended European Search Report from European Patent Application No. 14845729.4, dated May 8, 2017.
International Search Re ort and Written O inion from PCT/US2017/030452, dated Jul. 3, 2017.
Soloveichik, "Flow Batteries: Current Status and Trends," 2015, Chem. Rev., 115 (20), pp. 11533-11558.
International Search Report and Written Opinion dated Jan. 26, 2017, which issued in International Application No. PCT/US16/57963.
International Search Report and Written Opinion dated Jan. 19, 2017, which issued in dated Jan. 19, 2017, which issued in International Application No. PCT/US16/56672.
Ma et al., "High-performance supercapacitor electrodes based on porous flexible carbon nanofiber paper treated by surface chemical etching," Chemical Engineering Journal, Aug. 2014.
McCreery, "Advanced Carbon Electrode Materials for Molecular Electrochemistry," Chem Rev, 2008, pp. 2646-2687, vol. 108.
R.K. Sen, et al., "Metal-Air Battery Assessment," U.S. Department of Energy Report for Contract DE-AC06-76RLO1830, Ma 1988, 84 pages.
R.P. Hollandsworth, et al., "Zinc/Ferricyanide Battery Development Phase IV," U.S. Department of Energy Report for contract DE-AC04-76DP00789, Ma 1985, 278 pages.

* cited by examiner

HIGH-THROUGHPUT MANUFACTURING PROCESSES FOR MAKING ELECTROCHEMICAL UNIT CELLS AND ELECTROCHEMICAL UNIT CELLS PRODUCED USING THE SAME

CROSS-REFERENCE TO RELATED APPLICATIONS

This application is a divisional of U.S. patent application Ser. No. 15/093,598, filed Apr. 7, 2016, the disclosure of which is incorporated herein in its entirety.

STATEMENT REGARDING FEDERALLY SPONSORED RESEARCH OR DEVELOPMENT

Not applicable.

FIELD

The present disclosure generally relates to electrochemical unit cells and, more specifically, to high-throughput manufacturing processes for electrochemical unit cells for use in flow batteries and other electrochemical systems.

BACKGROUND

Electrochemical energy storage systems, such as batteries, supercapacitors and the like, have been widely proposed for large-scale energy storage applications. Various battery designs, including flow batteries, have been considered for this purpose. Compared to other types of electrochemical energy storage systems, flow batteries can be advantageous, particularly for large-scale applications, due to their ability to decouple the parameters of power density and energy density from one another.

Flow batteries generally include negative and positive active materials in corresponding electrolyte solutions, which are flowed separately across opposing sides of a membrane or separator in an electrochemical cell containing negative and positive electrodes. The flow battery is charged or discharged through electrochemical reactions of the active materials that occur inside the two half-cells. As used herein, the terms "active material," "electroactive material," "redox-active material" or variants thereof will synonymously refer to materials that undergo a change in oxidation state during operation of a flow battery or like electrochemical energy storage system (i.e., during charging or discharging). A full electrochemical cell contains two half-cells (i.e., a positive half-cell and a negative half-cell) that are separated by the separator material.

In order to increase the amount of energy that can be stored and released by a flow battery, a plurality of individual electrochemical cells can be placed in electrical communication with one another. Placing the individual electrochemical cells in electrical communication with one another typically involves positioning the individual electrochemical cells in a "cell stack" or "electrochemical stack" with a bipolar plate establishing electrical communication between adjacent electrochemical cells.

Design and fabrication of individual electrochemical cells typically involves the mating of various "hard goods" and "soft goods" together with one another. Soft goods can include the separator material, electrodes, and seals used to contain the electrolyte solution in a desired area within the electrochemical cell. Hard goods can include the bipolar plate and any framing materials used to contain the soft goods. Conventional manufacturing processes for electrochemical cells oftentimes mold and/or machine the hard goods for the individual cells, and cell assembly is then completed by positioning the soft goods manually or with semi-automated pick-and-place processes. Such manual and semi-automated batch processes for assembling electrochemical cells represent a rate-limiting manufacturing step that is largely incapable of producing high throughput. Even the molding and machining processes for the hard goods can become problematic if construction of a significantly large number of individual electrochemical cells is needed. Moreover, batch manufacturing processes of the foregoing types can be highly susceptible to producing faulty cells as a result of operator error. Accordingly, manufacturing processes for producing electrochemical cells aid cells stacks remain laborious, time-consuming, and expensive.

In view of the foregoing, electrochemical cell designs that are compatible with high-throughput manufacturing processes would be highly desirable in the art. The present disclosure satisfies the foregoing need and provides related advantages as well.

SUMMARY

In some embodiments, electrochemical unit cells of the present disclosure can include: a separator disposed between a first electrode and a second electrode, wherein the first electrode and the second electrode are sized and positioned such that first and second perimeter regions that are not in contact with the first and second electrodes exist on opposing sides of the separator, a first bipolar plate in contact with the first electrode; a second bipolar plate in contact with the second electrode; a first compressible seal disposed on the separator in the first perimeter region; a second compressible seal disposed on the separator in the second perimeter region; a first frame layer and a second frame layer defined about an outer perimeter of the first compressible seal and the second compressible seal; a third frame layer in contact with the first compressible seal and with the first frame layer, a fourth frame layer in contact with the second compressible seal and with the second frame layer, a fifth frame layer adjacent to the third frame layer; a sixth frame layer adjacent to the fourth frame layer; a seventh frame layer adjacent to the fifth frame layer, wherein the first bipolar plate is adhered to the seventh frame layer and occludes a window therein; and an eighth frame layer adjacent to the sixth frame layer; wherein the second bipolar plate is adhered to the eighth frame layer and occludes a window therein; and wherein each of the frame layers contains a non-conductive material.

In other various embodiments, electrochemical unit cells of the present disclosure can include: a separator disposed between a first electrode and a second electrode; wherein the first electrode and the second electrode are sized and positioned such dial first and second perimeter regions that are not in contact with the first and second electrodes exist on opposing sides of the separator; a first bipolar plate in contact with the first electrode; a second bipolar plate in contact with the second electrode; a first frame layer laminated to the separator in the first perimeter region; a second frame layer laminated to the separator in the second perimeter region; a third frame layer adjacent to the first frame layer, a fourth frame layer adjacent to the second frame layer; a fifth frame layer adjacent to the third frame layer; a sixth frame layer adjacent to the fourth frame layer, a seventh frame layer adjacent to the fifth frame layer; wherein the first bipolar plate is adhered to the seventh frame layer and occludes a window therein; and an eighth frame layer adjacent to the sixth frame layer; wherein the second bipolar plate is adhered to the eighth frame layer and occludes a window therein; and wherein each of the frame layers contains a non-conductive material.

Electrochemical stacks can include a plurality of the electrochemical unit cells abutted together with one another. In some embodiments, adjacent electrochemical unit cells within the electrochemical stack share a common bipolar plate and a common frame layer adhered to the common bipolar plate. In some embodiments, adjacent electrochemical unit cells within the electrochemical stack have a bipolar plate from a first electrochemical unit cell abutted together with a bipolar plate from a second electrochemical unit cell.

In still other various embodiments, methods for producing electrochemical cells can include: supplying rolls of a separator material, a cathode material, and an anode material to a production line: adhering the cathode material and the anode material on opposing sides of the separator material at a first location in the production line, thereby forming a soft goods assembly, supplying rolls of a first insulator material and a second insulator material to the production line; defining windows within the first insulator material and the second insulator material in the production line, adhering first and second frame layers comprising the first insulator material on opposing sides of the soft goods assembly in the production line, and adhering a third frame layer onto the first frame layer and a fourth frame layer onto the second frame layer in the production line, the third frame layer and the fourth frame layer comprising the second insulator material; supplying rolls of a third insulator material to the production line; defining windows within the third insulator material in the production line, and adhering a fifth frame layer onto the third frame layer and a sixth frame layer onto the fourth frame layer in the production line, the fifth frame layer and the sixth frame layer comprising the third insulator material, supplying rolls of a fourth insulator material and a bipolar plate material to the production line; and defining windows within the fourth insulator material in the production line, adhering the bipolar plate material to the fourth insulator material in the production line such that the windows in the fourth insulator material are occluded by the bipolar plate material, and adhering a seventh frame layer to the fifth frame layer and an eighth frame layer to the sixth frame layer in the production line, the seventh frame layer and the eighth frame layer comprising the fourth insulator material, thereby defining an electrochemical unit cell; wherein the windows within the first insulator material, the second insulator material and third insulator material overlay one another when disposed as the first, second, third, fourth, fifth and sixth frame layers; and wherein the bipolar plate material contacts the cathode material and the anode material on opposing sides of the soft goods assembly.

In yet still other embodiments, methods of the present disclosure can include: supplying a roll of a first insulator material to a production line; defining windows within the first insulator material in the production line: supplying a roll of a bipolar plate material to the production line, adhering the bipolar plate material to the first insulator material in the production line such that the windows in the first insulator material are occluded by the bipolar plate material, supplying rolls of a second insulator material to the production line; defining windows within the second insulator material in the production line and adhering the second insulator material on opposing sides of the first insulator material; supplying rolls of a third insulator material to the production line; defining windows within the third insulator material in the production line and adhering the third insulator material to the second insulator material on opposing sides of the first insulator material, supplying rolls of a fourth insulator material to the production line; and defining windows within the fourth insulator material in the production line and adhering the fourth insulator material to the third insulator material on opposing sides of the first insulator material.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

10A-10C and the hard goods assembly of FIGS. 13A-13C are stacked in an alternating manner.

DETAILED DESCRIPTION

Figure 1:
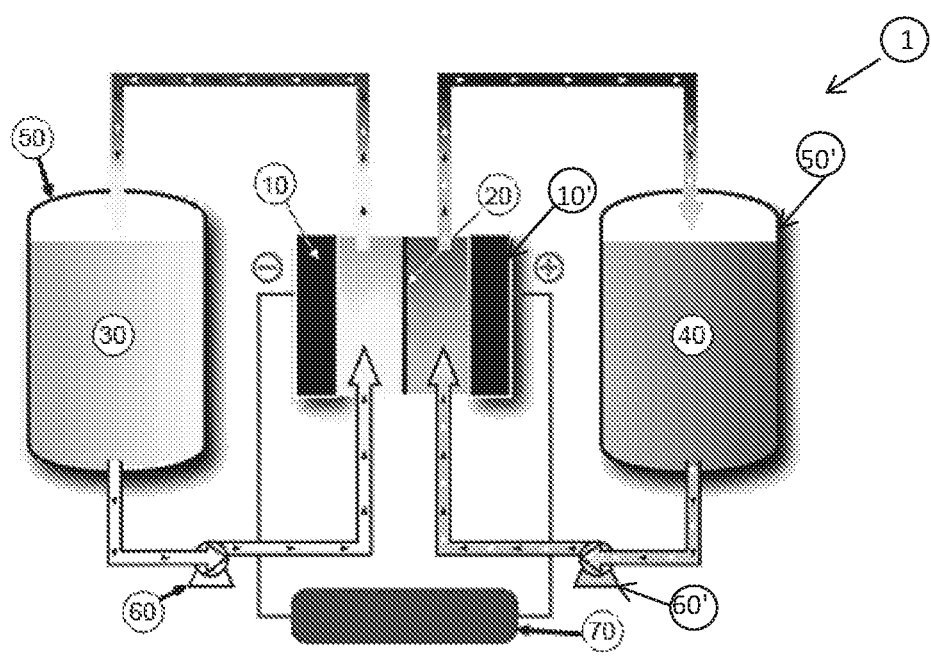
FIG. 1 shows a schematic of an illustrative flow battery containing a single electrochemical unit cell.

The present disclosure is directed, in part, to electrochemical unit cells and electrochemical cell stacks that are compatible with high-throughput manufacturing processes. The present disclosure is also directed, in part, to manufacturing processes for electrochemical unit cells and electrochemical cell stacks in which materials are supplied to a production line from rolled sources. The present disclosure is also directed, in part, to production line systems for manufacturing electrochemical unit cells and electrochemical cell stacks.

The present disclosure may be understood more readily by reference to the following description taken in connection with the accompanying figures and examples, all of which form a part of this disclosure. It is to be understood that this disclosure is not limited to the specific products, methods, conditions or parameters described and/or shown herein. Further, the terminology used herein is for purposes of describing particular embodiments by way of example only and is not intended to be limiting unless otherwise specified. Similarly, unless specifically stated otherwise, any description herein directed to a composition is intended to refer to both solid and liquid versions of the composition, including solutions and electrolytes containing the composition, and electrochemical cells, flow batteries, and other energy storage systems containing such solutions and electrolytes. Further, it is to be recognized that where the disclosure herein describes an electrochemical cell, flow battery, or other energy storage system, it is to be appreciated that methods for operating the electrochemical cell, flow battery, or other energy storage system are also implicitly described.

It is also to be appreciated that certain features of the present disclosure may be described herein in the context of separate embodiments for clarity purposes, but may also be provided in combination with one another in a single embodiment. That is, unless obviously incompatible or specifically excluded, each individual embodiment is deemed to be combinable with any other embodiment(s) and the combination is considered to represent another distinct embodiment. Conversely, various features of the present disclosure that are described in the context of a single embodiment for brevity's sake may also be provided separately or in any sub-combination. Finally, while a particular embodiment may be described as part of a series of steps or part of a more general structure, each step or sub-structure may also be considered an independent embodiment in itself.

Unless stated otherwise, it is to be understood that each individual element in a list and every combination of individual elements in that list is to be interpreted as a distinct embodiment. For example, a list of embodiments presented as "A, B, or C" is to be interpreted as including the embodiments "A," "B," "C," "A or B," "A or C," "B or C," or "A, B, or C."

In the present disclosure, the singular forms of the articles "a," "an," and "the" also include the corresponding plural references, and reference to a particular numerical value includes at least that particular value, unless the context clearly indicates otherwise. Thus, for example, reference to "a material" is a reference to at least one of such materials and equivalents thereof.

In general, use of the term "about" indicates approximations that can vary depending on the desired properties sought to be obtained by the disclosed subject matter and is to be interpreted in a context-dependent manner based on functionality. Accordingly, one having ordinary skill in the art will be able to interpret a degree of variance on a case-by-case basis. In some instances, the number of significant figures used when expressing a particular value may be a representative technique of determining the variance permitted by the term "about." In other cases, the gradations in a series of values may be used to determine the range of variance permitted by the term "about." Further, all ranges in the present disclosure are inclusive and combinable, and references to values stated in ranges include even value within that range.

As discussed above, energy storage systems that are operable on a large scale while maintaining high efficiency values can be extremely desirable. Flow batteries have generated significant interest in this regard, but no flow battery technologies that are truly commercially viable have yet been developed. The general lack of high-throughput manufacturing processes for flow batteries, particularly the individual electrochemical unit cells of flow batteries and electrochemical stacks of such electrochemical unit cells, is one issue that has hampered their successful commercial development. Exemplary description of illustrative flow batteries, their use, and operating characteristics is provided herein below.

The present inventors developed various designs for electrochemical unit cells that are readily compatible with high-throughput manufacturing techniques. The individual electrochemical unit cells of the present disclosure can also be combined with one another in electrochemical stacks to increase the amount of energy stored and released by a flow battery. More specifically, the inventors developed electrochemical cell designs that can be manufactured entirely or substantially with materials supplied from rolled sources to a production line, thereby allowing mass production of individual electrochemical unit cells to take place. Before further discussing the electrochemical unit cell designs and the manufacturing processes for their fabrication, a brief overview of flow batteries and their various components will be provided first.

FIG. 1 shows a schematic of an illustrative flow battery containing a single electrochemical unit cell. Unlike typical battery technologies (e.g. Li-ion, Ni-metal hydride, lead-acid, and the like), where active materials and oilier components are housed in a single assembly, flow batteries transport (e.g., via pumping) redox-active energy storage materials from storage tanks through an electrochemical stack. This design feature decouples the electrical energy storage system power from the energy storage capacity, thereby allowing for considerable design flexibility and cost optimization.

As shown in FIG. 1, flow battery system 1 includes an electrochemical cell that features separator 20 (e.g., a membrane) that separates the two electrodes 10 and 10' of the electrochemical cell. Electrodes 10 and 10' are formed from a suitably conductive material, such as a metal, carbon, graphite, and the like. Tank 50 contains first active material 30, which is capable of being cycled between an oxidized slide and a reduced state.

Pump 60 affects transport of find active material 30 from tank 50 to the electrochemical cell. The flow battery also suitably includes second tank 50' that contains second active material 40. Second active material 40 can be the same material as active material 30, or it can be different. Second pump 60' can affect transport of second active material 40 to the electrochemical cell. Pumps can also be used to affect transport of the active materials from the electrochemical cell back to tanks 50 and 50' (not shown in FIG. 1). Other methods of affecting fluid transport, such as siphons, for example, can also suitably transport first and second active materials 30 and 40 into and out of the electrochemical cell. Also shown in FIG. 1 is power source or load 70, which completes the circuit of the electrochemical cell and allows a user to collect or store electricity during its operation.

It should be understood that FIG. 1 depicts a specific, non-limiting configuration of a flow battery. Accordingly, flow batteries and electrochemical unit cells consistent with the spirit of the present disclosure can differ in various aspects relative to the configuration of FIG. 1. As one example, a flow battery system can include one or more active materials that are solids, gases, and/or gases dissolved in liquids. Active materials can be stored in a tank, in a vessel open to the atmosphere, or simply vented to the atmosphere.

As used heron, the terms "separator" and "membrane" will refer to an ionically conductive and electrically insulating material disposed between the positive and negative electrodes of an electrochemical cell (i.e., between the negative half-cell and the positive half-cell). The separator can be a porous membrane in some embodiments and/or an ionomer membrane in other various embodiments. In some embodiments, the separator can be formed from an ionically conductive polymer.

Polymer membranes can be anion- or cation-conducting electrolytes. Where described as an "ionomer," the term refers to polymer membrane containing both electrically neutral repealing units and ionized repeating units, where the ionized repeating units are pendant and covalently bonded to the polymer backbone. In general, the fraction of ionized repeating units can range from about 1 mole percent to about 90 mole percent. Ionized repeating units in an ionomer can include anionic functional groups such as sulfonate, carboxylate, and the like. These functional groups can be charge balanced by mono-, di-, or higher-valent cations, such as alkali or alkaline earth metals. Ionomers can also include polymer compositions containing attached or embedded quaternary ammonium, sulfonium, phosphazenium, and guanidinium residues or salts. Suitable examples will be familiar to one having ordinary skill in the art.

In some embodiments, polymers useful as a separator can include highly fluorinated or perfluorinated polymer backbones. Certain polymers useful in the present disclosure can include copolymers of tetrafluoroethylene and one or more fluorinated, acid-functional co-monomers, which are commercially available as NAFION™ perfluorinated polymer electrolytes from DuPont. Other useful perfluorinated polymers can include copolymers of tetrafluoroethylene and $FSO_2$—$CF_2CF_2CF_2CF_2$—O—$CF$=$CF_2$, FLEMION™ and SELEMION™.

Additionally, substantially non-fluorinated membranes that are modified with sulfonic acid groups (or cation exchanged sulfonate groups) can also be used. Such membranes can include those with substantially aromatic backbones such as, for example, polystyrene, polyphenylene, biphenyl sulfone (BPSH), or thermoplastics such as polyetherketones and polyethersulfones.

Battery-separator style porous membranes, can also be used as the separator. Because they contain no inherent ionic conduction capabilities, such membranes are typically impregnated with additives in order to function. These membranes typically contain a mixture of a polymer and inorganic filler, and open porosity. Suitable polymers can include, for example, high density polyethylene, polypropylene, polyvinylidene difluoride (PVDF), or polytetrafluoroethylene (PTFE). Suitable inorganic fillers can include silicon carbide matrix material, titanium dioxide, silicon dioxide, zinc phosphide, and ceria.

Separators can also be formed from polyesters, polyetherketones, poly(vinyl chloride), vinyl polymers, and substituted vinyl polymers. These can be used alone or in combination with any previously described polymer.

Porous separators are non-conductive membranes which allow charge transfer between two electrodes via open channels filled with electrolyte. The pore size distribution of a porous separator can be sufficient to substantially prevent the crossover of active materials between the two electrolyte solutions. Suitable porous membranes can have an average pore size distribution of between about 0.001 nm and 20 micrometers, more typically between about 0.001 nm and 100 nm. The size distribution of the pores in the porous membrane can be substantial. In other words, a porous membrane can contain a first plurality of pores with a very small diameter (approximately less than 1 nm) and a second plurality of pores with a very large diameter (approximately greater than 10 micrometers). The larger pore sizes can lead to a higher amount of active material crossover. The ability for a porous membrane to substantially prevent the crossover of active materials can depend on the relative difference in size between the average pore size and the active material. For example, when the active material is a metal center in a coordination complex, the average diameter of the coordination complex can be about 50% greater than the average pore size of the porous membrane. On the other hand, if a porous membrane has substantially uniform pore sizes, the average diameter of the coordination complex can be about 20% larger than the average pore size of the porous membrane. Likewise, the average diameter of a coordination complex is increased when it is further coordinated with at least one water molecule. The diameter of a coordination complex of at least one water molecule is generally considered to be the hydrodynamic diameter. In such embodiments, the hydrodynamic diameter is generally at least about 35% greater than the average pore size. When the average pore size is substantially uniform, the hydrodynamic radius can be about 10% greater than the average pore size.

In some embodiments, the separator can also include reinforcement materials for greater stability. Suitable reinforcement materials can include, for example, nylon, cotton, polyesters, crystalline silica, crystalline titania, amorphous silica, amorphous titania rubber, asbestos, wood or any combination thereof. Other suitable reinforcement materials can be envisioned by one having ordinary skill in the art.

Separators within can have a membrane thickness of less than about 500 micrometers, or less than about 300 micrometers, or less than about 230 micrometers, or less than about 200 micrometers, or less than about 100 micrometers, or less than about 75 micrometers, or less than about 50 micrometers, or less than about 30 micrometers, or less than about 25 micrometers, or less than about 20 micrometers, or less than about 15 micrometers, or less than about 10 micrometers. Suitable separators can include those in which a flow battery is capable of operating with a current efficiency of greater than about 85% with a current density of 100 $mA/cm^2$ when the separator has a thickness of 100 micrometers. In further embodiments, the flow battery is capable of operating at a current efficiency of greater than 99.5% when the separator has a thickness of less than about 50 micrometers, a current efficiency of greater than 99% when the separator has a thickness of less than about 25 micrometers, and a current efficiency of greater than 98% when the separator has a thickness of less than about 10 micrometers. Accordingly, suitable separators include those in which a flow battery is capable of operating at a voltage efficiency of greater than 60% with a current density of 100 mA/cm$^2$. In further embodiments, suitable separator can include those in which a flow battery is capable of operating at a voltage efficiency of greater than 70%, greater than 80% or even greater than 90%.

Flow batteries can also include an external electrical circuit in electrical communication with the first and second electrodes. The circuit can charge and discharge the flow battery, during operation. Reference to the sign of the net ionic charge of the first, second, or both active materials relates to the sign of the net ionic charge in both oxidized and reduced forms of the redox-active materials under the operating conditions of a flow battery. Further exemplary embodiments of a flow battery provide that (a) the first active material has an associated net positive or negative charge and is capable of providing an oxidized or reduced form over an electric potential in a range of the negative operating potential of the system, such that the resulting oxidized or reduced form of the first active material has the same charge sign (positive or negative) as the first active material and the ionomer membrane also has a net ionic charge of the same sign: and (b) the second active material has an associated net positive or negative charge and is capable of providing an oxidized or reduced form over an electric potential in a range of the positive operating potential of the system, such that the resulting oxidized or reduced form of the second active material has the same charge sign (positive or negative sign) as the second active material and the ionomer membrane also has a net ionic charge of the same sign; or both (a) and (b). The matching charges of the first and/or second active materials and the ionomer membrane can provide a high selectivity. More specifically, charge matching can provide less than about 3%, less than about 2%, less than about 1%, less than about 0.5%, less than about 0.2%, or less than about 0.1% of the molar flux of ions passing through the ionomer membrane as being attributable to the first or second active material. The term "molur flux of ions" will refer to the amount of ions passing through the ionomer membrane, balancing the charge associated with the flow of external electricity/electrons.

Particular electrode materials can include carbon and various metals. Non-conductive plastic materials can also constitute a portion of an electrode material. In some embodiments, electrodes can have a catalyst deposited thereon. Other types of layers can also be present on the electrode materials. Functions of the optional layers can include, for example, aiding cell assembly, improving contact resistance, and/or providing protection for the separator.

Figure 6:
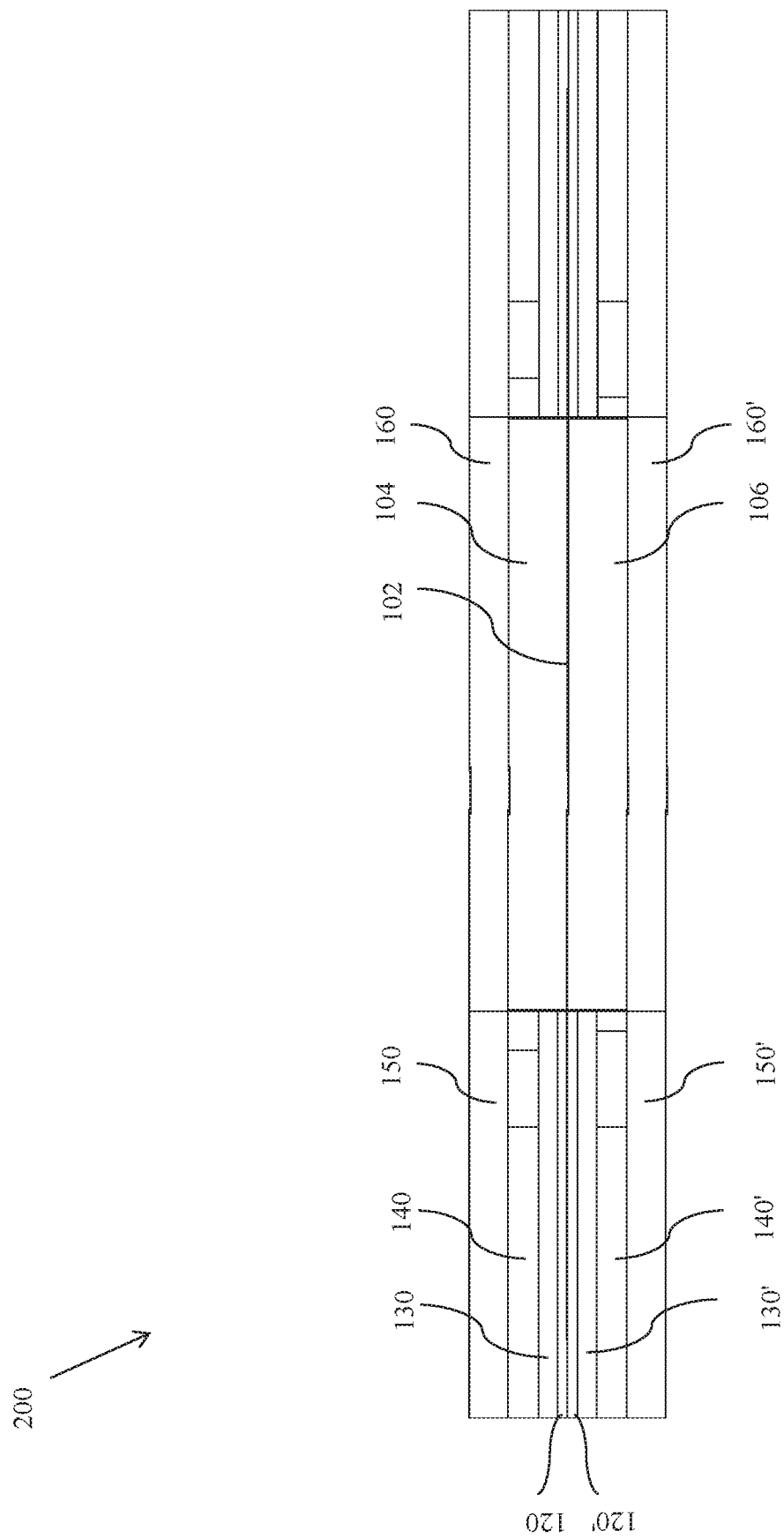
FIG. 6 shows a section view of the electrochemical unit cell of FIG. 5 with the various cell components fully abutted together with one another.
Figure 7:
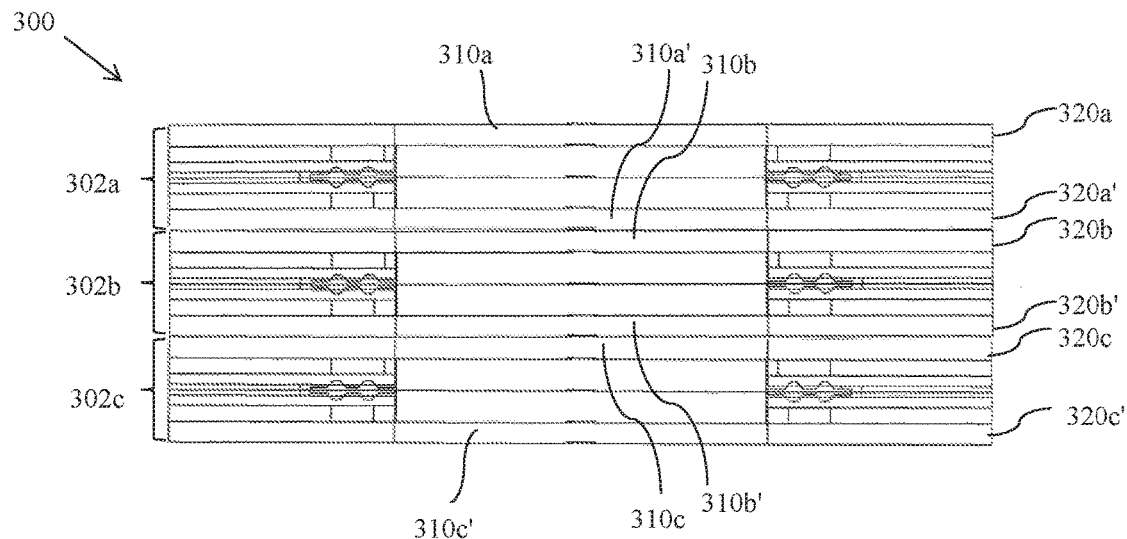
FIG. 7 shows a schematic of an illustrative electrochemical stack in which bipolar plates from adjacent electrochemical cells are abutted against one another.
Figure 8:
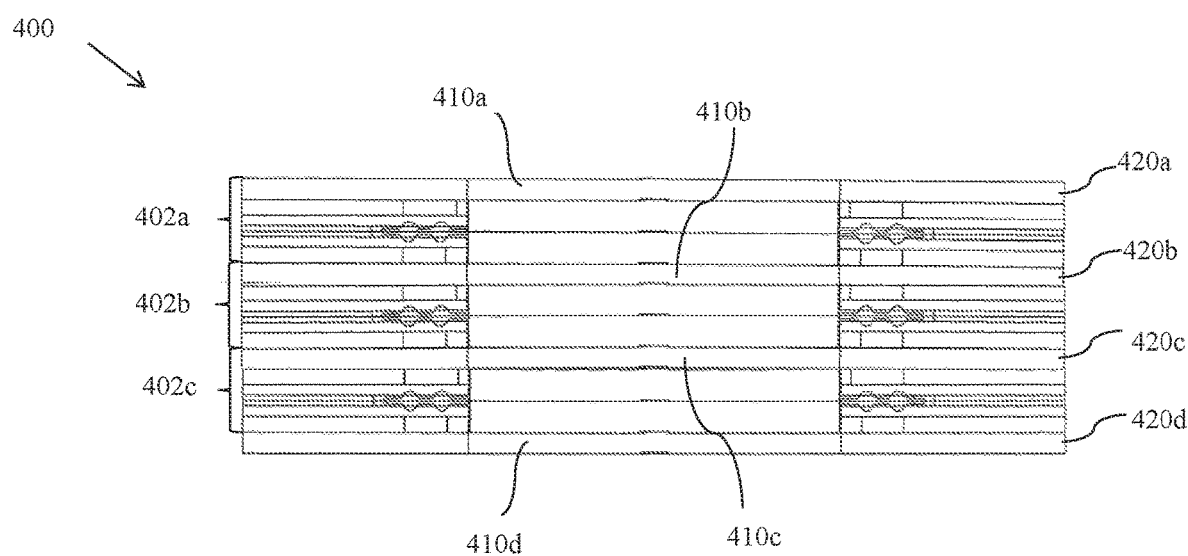
FIG. 8 shows a schematic of an illustrative electrochemical stack in which adjacent electrochemical cells share a common bipolar plate.

Having now described and depicted a generalized flow battery system, the various embodiments of the present disclosure will now be described in more detail with reference to the drawings. FIGS. 2-6 show illustrative configurations of single electrochemical unit cells that can be manufactured using high-through put manufacturing techniques: FIGS. 7 and 8 show illustrative configurations of electrochemical cell stacks incorporating a plurality of the electrochemical unit cell of FIG. 2. Further description of these FIGURES follows hereinafter. High-throughput manufacturing techniques for fabricating such electrochemical unit cells and electrochemical cell stacks are also addressed in more detail hereinbelow.

Figure 2:
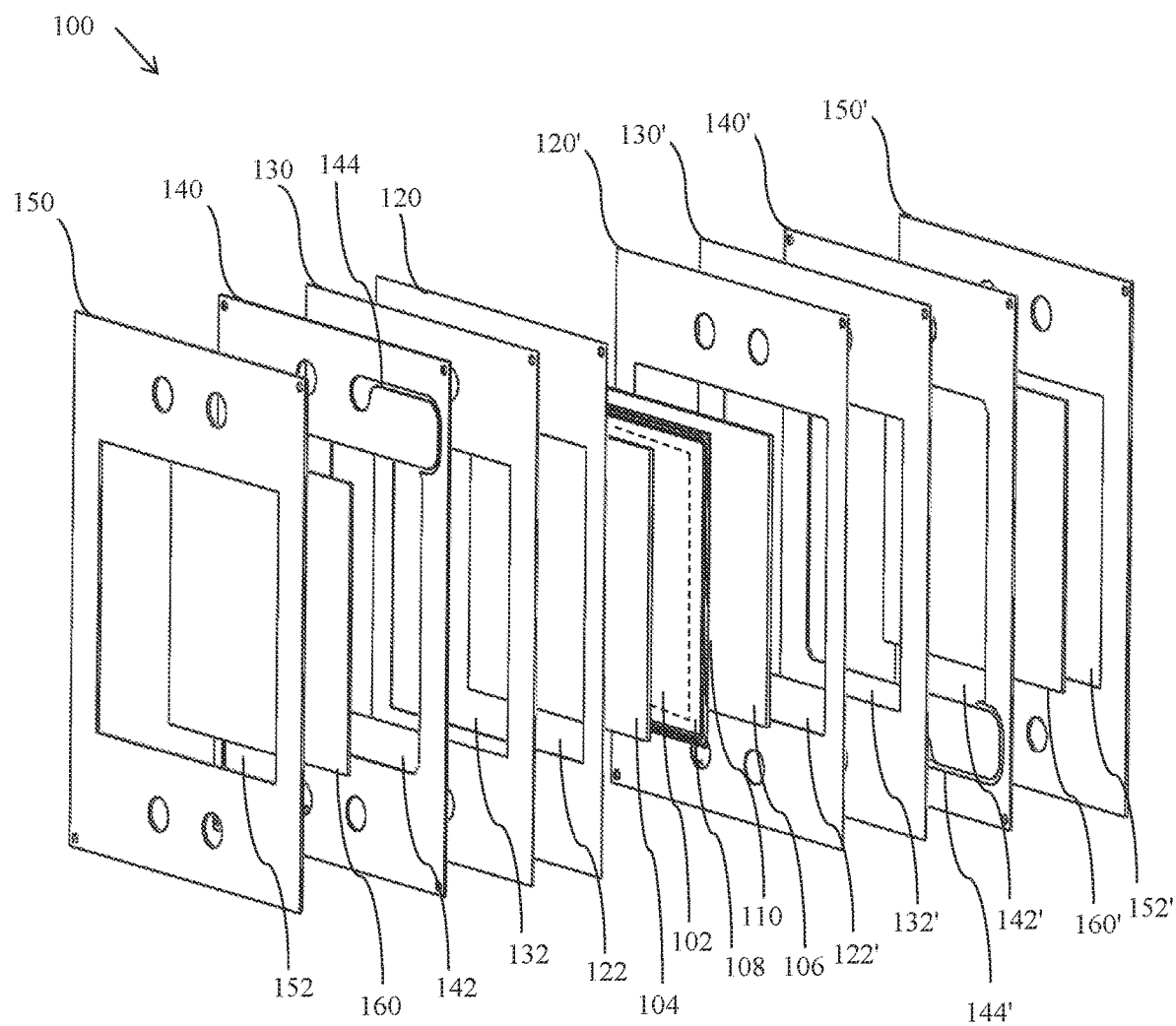
FIG. 2 shows an exploded view of an illustrative electrochemical unit cell configuration, in which the various cell components are spaced apart from one another to show detail.
Figure 3A:
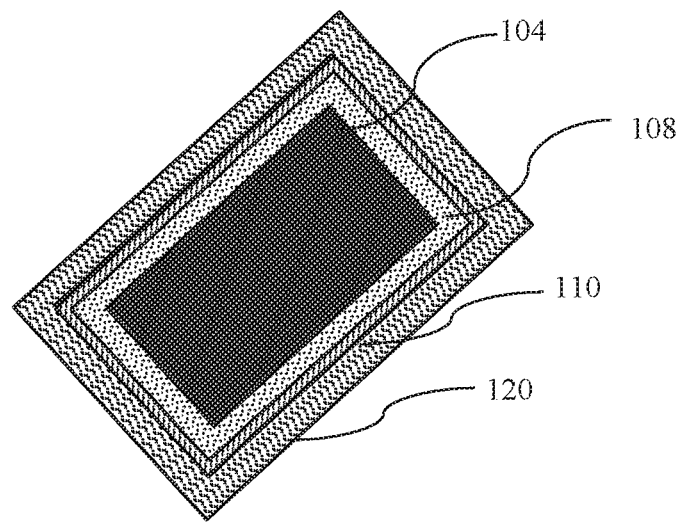
FIG. 3A shows a more detailed view from the cathode side of the electrochemical unit cell of FIG. 2.
Figure 3B:
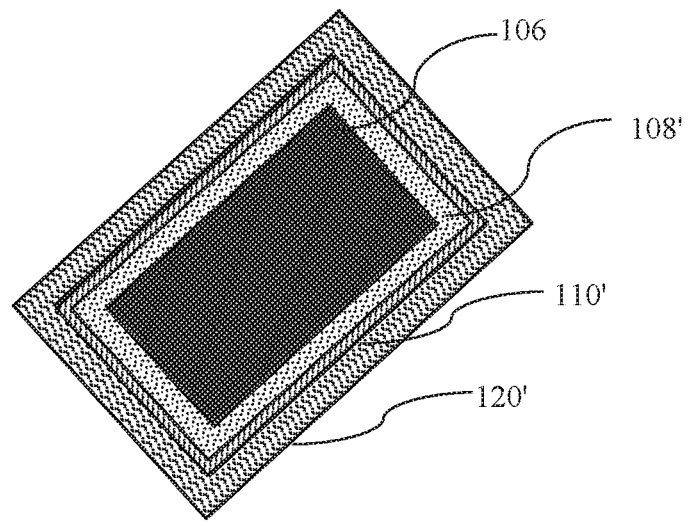
FIG. 3B shows a more detailed view from the anode side of the electrochemical unit cell of FIG. 2.
Figure 4:
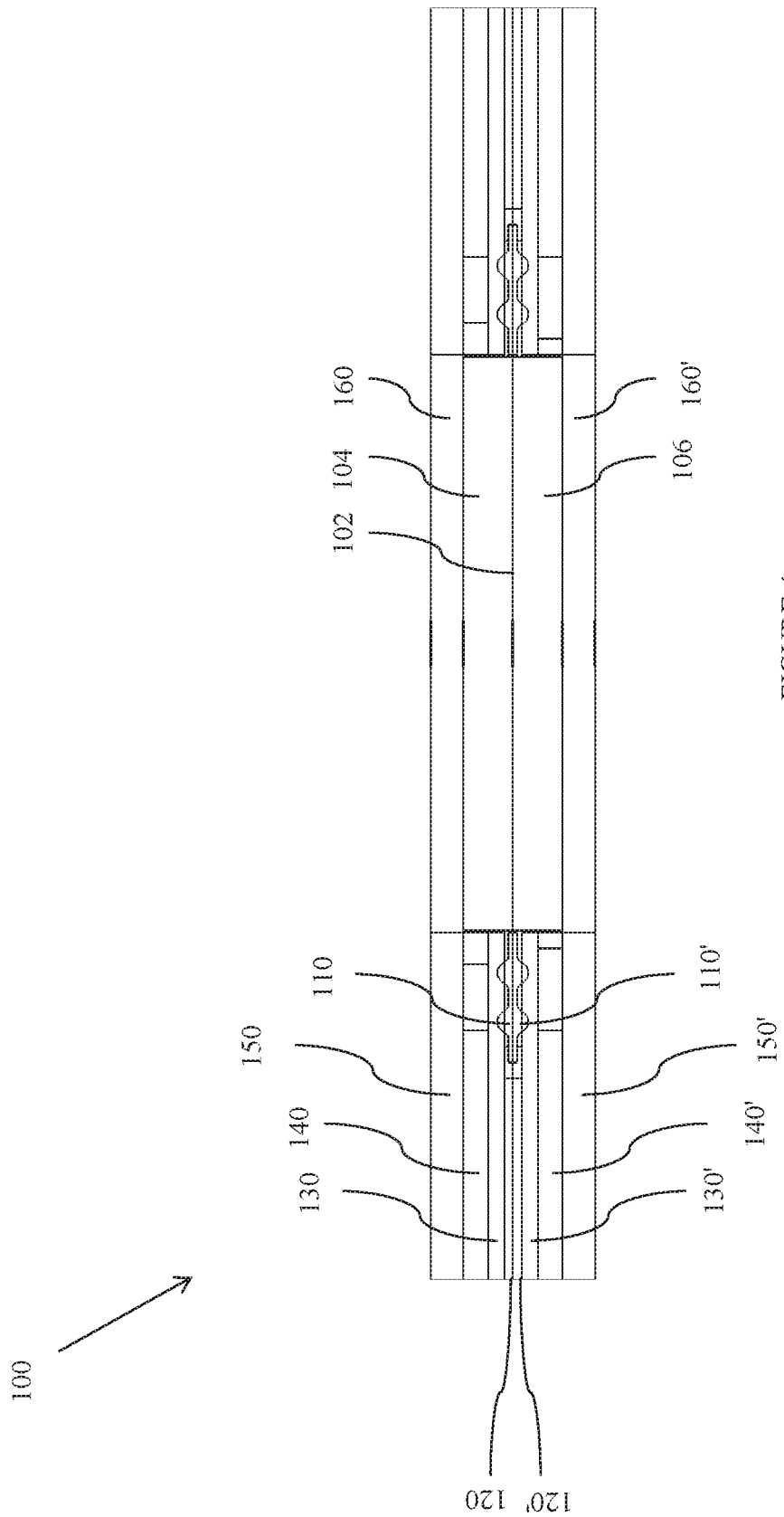
FIG. 4 shows a section view of the electrochemical unit cell of FIG. 2 with the various cell components fully abutted together with one another.

FIG. 2 shows an exploded view of an illustrative electrochemical unit cell configuration, in which the various cell components are spaced apart from one another to show detail. In practice, the various cell components are in contact with one another, as shown in FIG. 4, for example. Electrochemical unit cell 100 includes centrally disposed separator 102. Cathode 104 and anode 106 are abutted upon opposing sides of separator 102. Cathode 104 and anode 106 are smaller than separator 102 and are positioned such that non-contacted perimeter regions 108 and 108' are established around the periphery of separator 102 on both sides (non-contacted perimeter region 108' not shown in FIG. 2). Compressible seals 110 and 110' are disposed within non-contacted per meter regions 108 and 108', respectively, and contact separator 102 (compressible seal 110' not shown in FIG. 2). FIG. 3A shows a more detailed view from the cathode side of electrochemical unit cell 102, in which the disposition of non-contacted perimeter region 108 and its corresponding compressible seal 110 can be more clearly seen. FIG. 3B shows a corresponding view from the anode side. As discussed in more detail hereinafter, an underlayment can be present between separator 102 and compressible seals 110 and 110'. The underlayment can provide rigidity, aid alignment during later assembly processes, control the compression of compressible seals 110 and 110', and promote bonding between dissimilar materials. Separator 102, cathode 104, anode 106, and compressible seals 110 and 110' constitute the "soft goods" or "soft goods assembly" of electrochemical unit cell 100.

The "hard goods" of electrochemical unit cell 100 will now be further described with reference to FIGS. 2, 3A and 3B. Frame layers 120 and 120' include respective windows 122 and 122'. Windows 122 and 122' are sized such that frame layers 120 and 120' fit around the outer perimeter of compressible seals 110 and 110', as shown in more detail in FIGS. 3A and 3B. The thickness of frame layers 120 and 120' can dictate the extent to which compressible seals 110 and 110' are compressed upon adding further layers, as discussed hereinafter. Although FIGS. 3A and 3B have shown frame layers 120 and 120' in direct contact with compressible seals 110 and 110', respectively, it is to be recognized that some open space can exist between the two depending on lie size of windows 122 and 122'. The open space can also dictate how much compressible seals 110 and 110' can outwardly expand upon undergoing compression.

With continued reference to FIG. 2, frame layers 130 and 130' contact frame layers 120 and 120', respectively, while also contacting compressible seals 110 and 110', respectively. Windows 132 and 132' are defined in frame layers 130 and 130', respectively. Windows 132 and 132' are smaller in size than windows 122 and 122' to allow for frame layers 130 and 130' to contact compressible seals 110 and 110'. In addition to dictating the extent to which compressible seals 110 and 110' can be compressed, frame layers 120 and 120' provide a stable structure against which frame layers 130 and 130' can provide a compressive force. Frame layers 140 and 140' contact frame layers 130 and 130', respectively, and also have windows 142 and 142' respectively defined therein. In addition, frame layers 140 and 140' contain flow distribution channels 144 and 144' defined respectively therein, which extend to the internal space defined by windows 142 and 142'. Flow distribution channels 144 and 144' allow electrolyte solutions to be provided independently (e.g., from a fluid distribution manifold) to the two half-cells of electrochemical unit cell 100. Although not shown in FIG. 2, similar flow distribution channels can be present in frame layers 150 and 150'. Further, additional frame layers can also be present, and any of the additional frame layers not contacting compressible seals 110 and 110' can contain flow distribution channels similar to those shown in frame layers 140 and 140'.

Electrolyte solution can be provided to flow distribution channels 144 and 144' from a plurality of openings disposed within each of frame layers 120, 120', 130, 130', 140, 140', 150 and 150'. The openings define continuous flow pathways extending through electrochemical unit cell 100. More particularly, the openings provide a location for ingress and egress of electrolyte solutions to and from the corresponding half-cell upon connection of electrochemical unit cell 100 to a fluid distribution manifold. The openings on opposing sides of frame layers 120, 120', 130, 130', 140, 140', 150 and 150' are paired such that each electrolyte solution only enters a single half-cell. While FIG. 2 has shown the plurality of openings as being substantially circular in shape, it is to be recognized that other shapes are also possible.

Still referring to FIG. 2, electrochemical unit cell 100 also includes frame layers 150 and 150', which have windows 152 and 152' respectively defined therein. Bipolar plates 160 and 160' fill windows 152 and 152' of corresponding frame layers 150 and 150'. Bipolar plates 160 and 160'are adhered to frame layers 150 and 150', for example, by techniques such as adhesive bonding, layer welding, ultrasonic welding, hot plate welding, hot rolling, or lamination with a pressure-sensitive adhesive or thermal bonding film. Adhering bipolar plates 160 and 160' to respective frame layers 150 and 150' precludes electrolyte solution leakage around bipolar plates 160 and 160' in the finished cell. Bipolar plate 160 further extends through windows 122, 132 and 142 and contacts cathode 104. Similarly, bipolar plate 160' further extends through windows 122', 132' and 142' and contacts anode 106. The thickness of bipolar plates 160 and 160' can be chosen and adjusted to account for the overall thickness of electrochemical unit cell 100 and its various layers. Alternately, the thickness of cathode 104 and anode 104' can be chosen and adjusted similar to account for the overall thickness of electrochemical unit cell 100.

FIG. 4 shows a section view or the electrochemical unit cell of FIG. 2 with the various cell components fully abutted together with one another. Frame layers 120, 130, 140 and 150 can be adhered to one another as a group, and frame layers 120', 130', 140' and 150' can be adhered to one another as a group when the various components are abutted together in the configuration of FIG. 4. Frame layers 120 and 120' are simply abutted against one another and held in place by compressive forces in the configuration of FIG. 4. As shown below in FIG. 6, frame layers 120 and 120' can also be adhered to one another to collectively adhere each of the frame layers together as single group. The adherence of the various layers to one another defines chambers on opposing sides of separator 102 through which electrolyte solutions can be circulated. That is, frame layers 120, 130 and 140 together with separator 102, compressible seal 110, and bipolar plate 160 collectively define a closed chamber through which a first electrolyte solution can be flowed about cathode 104. Similarly, frame layers 120', 130', 140', separator 102, compressible seal 110' and bipolar plate 160' define a closed chamber through which a second electrolyte solution can be flowed about anode 106. Compressible seals 110 and 110' preclude overboard fluid leaks and unwanted fluid transfer between the closed chambers separately housing the first electrolyte solution and the second electrolyte solution. The volumes of the respective chambers are determined, for example, by the thickness of the various frame layers and the size of the corresponding windows. As described further hereinbelow, electrochemical cells similar to those depicted in FIGS. 2, 3A, 3B and 4 can be fabricated from materials where each component is provided from a rolled source, thereby allowing fabrication by high-throughput manufacturing processes to take place.

In the electrochemical unit cell configuration of FIGS. 2 and 4, compressible seals 110 and 110' are adhered on opposing side of separator 102. In an alternative to the cell configuration shown in those FIGURES, compressible seals can be provided on the hard goods assembly. In some embodiments, compressible seals 110 and 110' can be defined around the perimeter of windows 122 and 122' in first frame layer 120 and second frame layer 120'. In other embodiments, compressible seals 110 and 110' can be defined upon the face of bipolar plates 160 and 160', specifically around the outer perimeter of bipolar plates 160 and 160'. These alternative seating locations can function similarly in containing each electrolyte solution in its respective half-cell.

In more particular embodiments, each of the components of electrochemical unit cell 100 and the other electrochemical unit cells and electrochemical cell stacks of the present disclosure can be formed from a material that is provided in rolled form. That is, in some embodiments, each of the materials can be supplied in reel-to-reel manufacturing processes for producing the electrochemical cells and related electrochemical cell stacks. Further disclosure regarding illustrative manufacturing processes for the electrochemical unit cells and electrochemical cell stacks follows hereinbelow. Where not already described hereinabove, suitable materials for the various components of the electrochemical unit cells will be described in more detail next.

Each of frame layers 120, 120', 130, 130', 140, 140', 150 and 150' can be formed from a non-conductive material (e.g., an insulator), particularly a material that can be supplied in a rolled form such as a film or sheet. In more particular embodiments, each frame layer can be formed from a thermoplastic material such as polyethylene or other polyolefin material. Additional suitable polyolefin materials can include, for example, acrylonitrile-butadiene-styrene (ABS) copolymers, polypropylene, polyvinyl chloride and the like. Non-olefinic polymers such as, for example, polyamides (e.g., nylons), polyesters, polyetherimides (e.g., ULTEM), polyimides (e.g., KAPTON), polyetherketones, polysulfones, and the like can also be suitably used. Other suitable materials for forming the various frame layers can similarly be envisioned by one having ordinary skill in the art. Choice of a particular material for forming frame layers 120, 120', 130, 130', 140, 140', 150 and 150' an be dictated, for example, by the intended operating environment and concerns related to chemical compatibility of a particular electrolyte solution contacting the frame layers.

Suitable materials for forming separator 102 can include those generally discussed above. Such separator materials can be supplied in rolled form by a number of suppliers such as DuPont, Gore, Solvay, and 3M, for example. Both porous separators and ion exchange (ionomer) membranes are available in this format.

Suitable materials for cathode 104 and anode 106 can generally include any conductive material that is conventionally used for this purpose in flow batteries and other electrochemical systems. Particular examples of suitable materials for forming an electrode are discussed above. Like the other components of the electrochemical unit cells disclosed herein, the materials for cathode 104 and anode 106 can likewise be supplied in rolled form. In more specific embodiments, at least one of cathode 104 and anode 106 can be made from a carbon felt, particularly an uncoated carbon felt. In other more specific embodiments, cathode 104 and anode 106 can be made from any conductive material in the form of a woven cloth, mesh, or screen; a non-woven paper; a film; a foil, or a sheet that can be supplied in rolled form. Particular electrode materials can include carbon and various metals that are supplied in rolled form. Non-conductive plastic materials can also constitute a portion of an electrode material being supplied in rolled form. In some embodiments, at least one of cathode 104 and anode 106 can have a catalyst deposited thereon. The catalyst, if present, can be supplied on the electrode material (e.g., in rolled form) as the electrochemical cell is being fabricated. Other layers can also be optionally present on cathode 104 and/or anode 106. Functions of the optional layers can include, for example, aiding cell assembly, improving contact resistance, and/or providing protection for separator 102. Deposition of any additional layers upon the material forming cathode 104 and/or anode 106 can occur by any of a variety of deposition techniques such as, for example, spray coating, screen printing, roller coating, gravure coating, dip coating, slot die coating, and the like. The coating can already be present on the conductive material as-supplied, or it can be introduced in a continuous process during fabrication of the electrochemical unit cells.

As indicated above, compressible seals 110 and 110' help establish coherent chambers through which first and second electrolyte solutions can separately flow. That is, functions of compressible seals 110 and 110' can include preventing overboard leaks and precluding fluid transport of the first and second electrolyte solutions around separator 102. Instead, mass transport in electrochemical unit cell 100 and other electrochemical cells and cell stacks of the present disclosure occurs via ionic conduction across separator 102.

In more particular embodiments, compressible seals 110 and 110' can be formed from an elastomeric material. Examples of suitable elastomeric materials for forming compressible seals 110 and 110' will be familiar to one having ordinary skill in the art and can be chosen to have chemical compatibility with the electrolyte solution and/or environmental compatibility with the operating conditions of the electrochemical unit cell, for example. Suitable elastomeric materials can include, for example, silicone polymers, fluoroelastomers, ethylene propylene diene copolymer (EPDM), polytetrafluoroethylene, natural rubber, synthetic rubber, and the like. Suitable elastomeric materials can also be provided in rolled form. In more particular embodiments, a thermoplastic underlayment (not shown in FIGS. 2, 3A, 3B and 4) can be applied between separator 102 and compressible seals 110 and 110'. Like compressible seals 110 and 110', the thermoplastic underlayment also lies within non-contacted perimeter regions 108 and 108' on either side of separator 102. In more particular embodiments, compressible seals 110 and 110', the corresponding thermoplastic underlayment, and separator 102 can be adhered to one another, such as through adhesive bonding to form a soft goods assembly. Adhesive bonding can take place during fabrication of the electrochemical unit cell. Suitable adhesive bonding techniques and compositions that can be utilized in this regard include, for example, pressure-sensitive adhesives. UV-curable adhesives, thermal bonding film, epoxies, solvent-bonded adhesives, and hot-press or hot-lamination techniques. In some embodiments, at least one of compressible seals 110 and 110' can be provided in the form of an elastomeric beaded seal. In some or other embodiments, at least one of compressible seals 110 and 110' can be provided in the form of a flat elastomeric gasket.

Bipolar plates 160 and 160' can be formed of any suitable electrically conductive and substantially non-permeable material. In more specific embodiments, at least one of bipolar plates 160 and 160' can be formed from a flexible graphite foil, expanded graphite, or a metal film, foil, or sheet. Such materials can be supplied in rolled form in some embodiments. In some embodiments, at least one of bipolar plates 160 and 160' can have surface features defined thereon that function to alter the flow distribution of an electrolyte solution within one or both of the half-cells of electrochemical unit cell 100 or a similar electrochemical unit cell. For example, such surface features can help distribute an electrolyte solution evenly over the surface of cathode 104 and/or anode 106. In illustrative embodiments, the surface features can include interdigitated or quasi-interdigitated flow channels, which can be formed by both additive and subtractive production methods, such as extrusion, stamping, milling, ablation, or roller embossing.

As indicated above, bipolar plates 160 and 160' extend through windows 152 and 152', respectively, so that individual electrochemical unit cells can be combined with one another in an electrochemical stack. To provide an intact chamber through which an electrolyte solution can flow without leakage, bipolar plates 160 and 160' can be adhered to frame layers 150 and 150' and occlude windows 152 and 152' therein, respectively. In addition, bipolar plates 160 and 160' can extend through the remaining frame layers in electrochemical unit cell 100 and contact cathode 104 and anode 106, respectively.

During fabrication of electrochemical unit cell 100 or a similar electrochemical unit cell, any of frame layers 120, 130, 140, 150, 120', 130', 140 ' and 150' can be supplied from a suitable rolled material and the various features (e.g., windows, flow distribution channels, headers, plenums, fluid manifolds, alignment features, and the like) therein can be defined by a suitable manufacturing technique. Suitable manufacturing techniques for defining features within the frame layers can include, for example, die-cutting, laser cutting, stamping, and the like.

Following fabrication of electrochemical unit cell 100 or a similar electrochemical unit cell, frame layers 120, 130, 140, and 150 can become collectivly adhered to one another, and frame layers 120', 130', 140' and 150' can also become collectively adhered to one another. Again, this helps define coherent chambers through which first and second electrolyte solutions can flow through the two half-cells. Suitable techniques for adhering the frame layers to one another can include those listed above. Particularly suitable techniques for adhering the frame layers can include adhesive bonding techniques and compositions such as, for example, pressure-sensitive adhesives, heal-cured adhesives, and UV-cured adhesives, such as epoxies. In alternative embodiments, techniques such as layer welding, ultrasonic welding, hot plate welding, hot rolling, stir-friction welding, pressure-sensitive adhesives, or thermal bonding films can be used to adhere the frame layers to one another as appropriate.

Although electrochemical unit cell 100 contains four frame layers (i.e., 120, 130, 140 and 150, and 120', 130', 140' and 150) on each side of separator 102, it is to be recognized that additional frame layers can be present in other embodiments of the present disclosure. Additional frame layers can be added to solve particular design challenges and/or to alter the overall thickness of electrochemical unit cell 100. In some embodiments, any frame layers added to increase the thickness of electrochemical unit cell 100 can have windows defined therein so that a bipolar plate can extend therethrough, but otherwise such frame layers can lack other distinguishing structural features. In some or other embodiments, additional frame layers can include structural features appropriate to meet the needs of particular design considerations, such as flow distribution features and conduits to allow fluid introduction at a particular location within a given half-cell.

Figure 5:
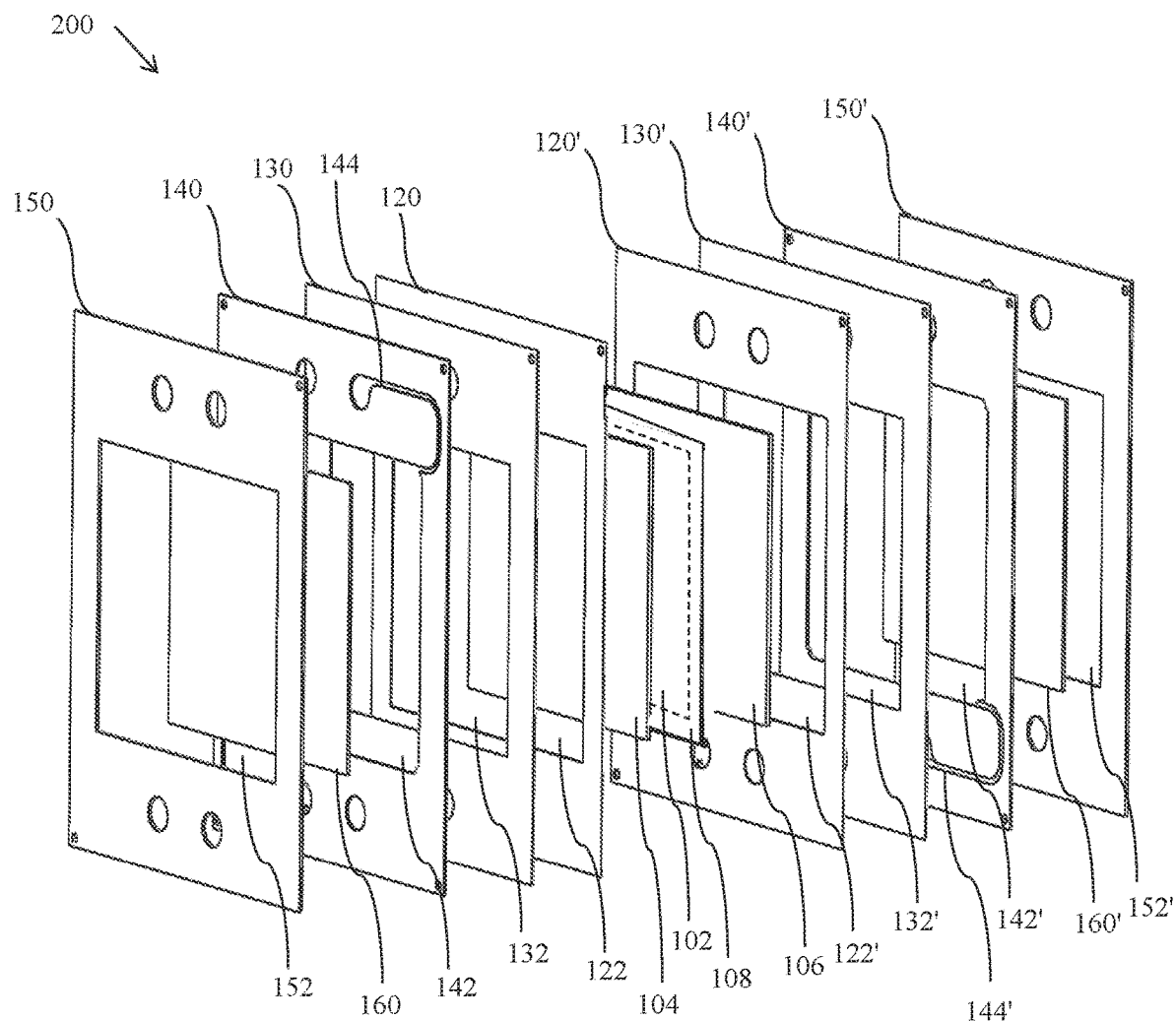
FIG. 5 shows an exploded view of another illustrative electrochemical unit cell configuration, in which the various cell components are spaced apart from one another to show detail.

FIG. 5 shows an exploded view or another illustrative electrochemical unit cell configuration, in which the various cell components are spaced apart from one another to show detail. Electrochemical unit cell 200 in FIG. 5 differs primarily from electrochemical unit cell 100 of FIGS. 2, 3A, 3B and 4 in that compressible seals 110 and 110' are omitted from non-contacted perimeter regions 108 and 108', respectively. Otherwise, the elements of the electrochemical unit cell configuration in FIG. 5 are similar to those in FIG. 2, and like reference characters will be used as a result. Likewise, elements in common between FIGS. 2 and 5 will not be described again in detail unless their disposition differs in the alternative cell configuration.

In the cell configuration of FIG. 5, frame layers 120 and 120' make direct contact with opposing sides of separator 102 and are adhered thereto, such as through adhesive bonding. Direct bonding of this type can function to promote sealing in manner similar to that provided by compressible seals 110 and 110' in the cell configuration of FIG. 2. Hence, compressible seals 110 and 110' can be omitted in the electrochemical unit cell configuration of FIG. 5. A resulting distinction between the cell configuration of FIG. 2 and that of FIG. 5 is that disassembly of the cell can be more difficult for the latter (e.g., to conduct an analysis or examination after operating the cell for a period of time). In particular, the cell configuration of FIG. 5 contains the two half-cells bonded to one another at separator 102, whereas the cell configuration of FIG. 2 can be disassembled by relieving the confinement pressure of frame layers 120 and 120' upon compressible seals 110 and 110'. In alternative configurations, the cell configuration of FIG. 6 can include compressible seals similar to those described above in reference to FIG. 2. A seal underlayment can be present in some instances when a seal is present. Alternately, a seal underlayment can be provided as an assembly aid between separator 102 and frame layers 120 and 120'. FIG. 6 shows a section view of the electrochemical unit cell of FIG. 5 with the various cell components fully abutted together with one another.

As indicated above, a plurality of electrochemical unit cells can be combined with one another to produce electrochemical stacks of varying sizes. More particularly, a plurality of the electrochemical cells can be stacked upon one another such that the individual electrochemical unit cells are abutted together along an axis defined through the bipolar plates, cathode, separator and anode of the individual electrochemical unit cells. Electrical communication between the individual electrochemical unit cells takes place through the bipolar plates disposed at the axial termini or each electrochemical unit cell. Depending upon how the electrochemical unit cells are manufactured, adjacent electrochemical unit cells can either share a common bipolar plate and frame layer adhered of the bipolar plate, or bipolar plates from adjacent electrochemical cells within the electrochemical stack can be abutted against one another (i.e., in a head-to-tail fashion).

In some embodiments, bipolar pales from adjacent electrochemical unit cells within an electrochemical stack can be abutted against one another. FIG. 7 shows a schematic of an illustrative electrochemical stack in which bipolar plates from adjacent electrochemical cells are abutted against one another. The individual electrochemical unit cells in FIG. 7 have a cell configuration similar to that shown in FIG. 4 and will not be described again in detail. The cell configuration of FIG. 6 can be employed similarly. FIG. 7 shows illustrative three-cell electrochemical stack 300. Electrochemical stack 300 contains electrochemical unit cells 302a, 302b and 302c, which have been placed head-to-tail with respect to each other. That is in adjacent electrochemical cells 302a and 302b, bipolar plates 310a' and 310b abut one another, and bipolar plates 310b' and 310c abut one another in adjacent electrochemical cells 302b and 302c. Bipolar plates 310a and 310c' lie at the axial termini of electrochemical stack 300 and do not abut another bipolar plate. Similarly, frame layers 320a' and 320b abut one another, as do frame layers 320b' and 320c. Frame layers 320a and 320c' lie at the axial termini and do not abut another frame layer.

In alternative embodiments, adjacent electrochemical unit cells within the electrochemical stack can share a common bipolar plate. FIG. 8 shows a schematic of an illustrative electrochemical stack in which adjacent electrochemical cells share a common bipolar plate. Again, the individual electrochemical unit cells in FIG. 8 have a cell configuration similar to that shown in FIG. 4 and will not be described again in detail. The cell configuration of FIG. 6 can be employed similarly. FIG. 8 shows illustrative three-cell electrochemical stack 400. Electrochemical stack 400 contains electrochemical unit cells 402a, 402b and 402c, where a common bipolar plate and frame layer is shared between adjacent electrochemical unit cells. Ultimately, electrochemical unit cells 402a-402c are the same as those shown in FIGS. 2 and 7, except for lacking a second bipolar plate and corresponding frame layer about the second bipolar plate. Accordingly, the repeat unit within electrochemical stack 400 differs from that of electrochemical stack 300. With more particular reference to FIG. 8, adjacent electrochemical unit cells 402a and 402b share bipolar plate 410b, and adjacent electrochemical unit cells 402b and 402c share bipolar plate 410c. Bipolar plates 410a and 410d and frame layers 420a and 420d lie at the axial termini of electrochemical stack 400 and are not shared with another electrochemical unit cell. Similarly, frame layer 420b is shared between adjacent electrochemical unit cells 402a and 402b, and frame layer 420c is shared between adjacent electrochemical unit cells 402b and 402c. Electrochemical stack configurations similar to those shown in FIG. 8 can be prepared by downstream modification of the manufacturing processes disclosed herein.

Although electrochemical stacks 300 and 400 in FIGS. 7 and 8 have shown the particular electrochemical unit cell configuration shown in FIG. 4, it is to be recognized that similar electrochemical stacks can be produced using the electrochemical unit cell configuration of FIG. 6 as well. In addition, depending on various operational considerations, differing unit cell configurations can be present in a given electrochemical stack in some embodiments of the present disclosure. Further in some embodiments, the electrochemical stack configuration of FIG. 8 can be iteratively stacked to produce even larger electrochemical stacks. For example, a 3-cell stack configuration similar to that shown in FIG. 8 can be iteratively stacked ten times to produce a 30-cell electrochemical stack. Alternately, the individual electrochemical unit cells from the electrochemical stack configuration of FIG. 7 can also be incorporated in a modified electrochemical stack containing the stack configuration of FIG. 8. Accordingly, the electrochemical stack configurations depicted in FIGS. 7 and 8 should not be considered limiting.

Likewise, although FIGS. 1 and 8 have depicted three-cell electrochemical stacks, it is to be understood that any number of individual electrochemical unit cells can be present depending on the desired amount of power to be stored and other operational considerations. Accordingly, the depicted electrochemical stack configurations of FIGS. 7 and 8 should not be considered limiting. In various embodiments, electrochemical stacks can contain between about 30 and 200 individual electrochemical unit cells, or between about 50 and about 100 individual electrochemical unit cell, or between about 100 and about 200 individual electrochemical unit cells. Interconnection of the various electrochemical unit cells in an electrochemical stack can take place through any of the adherence techniques described herein, such as adhesive bonding, hot pressing, lamination, laser welding, ultrasonic welding, and the like.

As indicated above, the electrochemical unit cells of the present disclosure can be fabricated by various high-throughput manufacturing techniques, such as red-based manufacturing techniques. Illustrative manufacturing techniques for the electrochemical unit cells of the present disclosure will now be described in more detail.

Ultimately, it can be desirable to fabricate the electrochemical unit cells and related electrochemical cell stacks of the present disclosure in a "unitized" fashion by concurrently processing both the soft goods and the hard goods along a single production line. It is to be recognized, however, that the electrochemical unit cells can also be fabricated by processing the soft goods and the hard goods in separate production lines and then combining the hard goods and soft goods together to form completed electrochemical unit cells. In order to facilitate a better understanding of the "unitized" production process, separate fabrication processes for the soft goods and the hard goods will be described first.

Figure 9:
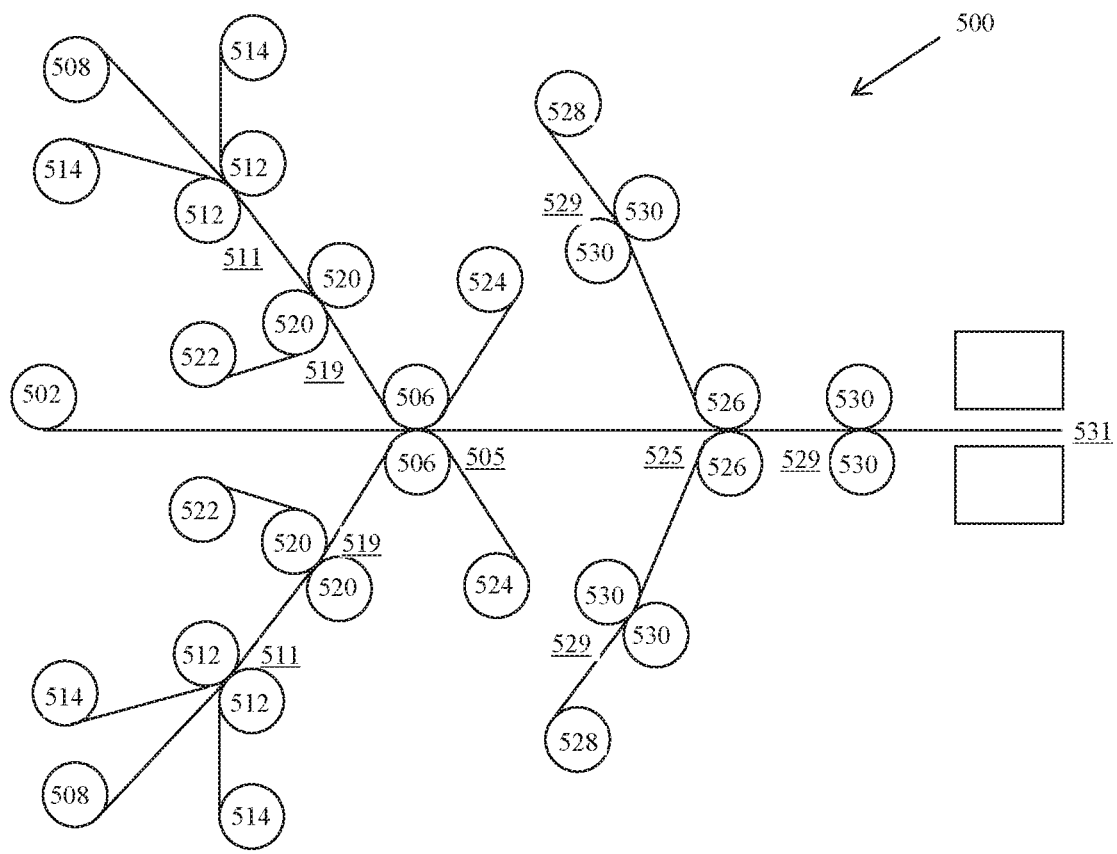
FIG. 9 shows a schematic of an illustrative production line that can combine the soft goods of an electrochemical unit cell in a continuous fashion.

FIG. 9 shows a schematic of an illustrative production line that can combine the soft goods of an electrochemical unit cell in a continuous fashion. As depicted in FIG. 9, each of the source materials forming the soft goods are supplied from a rolled source. These source materials, where appropriate, will be referred to by their reference characters from FIGS. 2-8, and FIG. 9 may be better understood by reference to these preceding FIGURES As shown in FIG. 9, reel 502 supplies a roll of separator 102 to production line 500. Separator 102 undergoes lamination to an underlayment at station 505 containing rollers 506. Prior to reaching station 505, a roll of the underlayment is supplied from reels 508, and pressure-sensitive adhesive is laminated onto opposing faces of the underlayment at stations 511, which contains rollers 512. Layers of the pressure-sensitive adhesive are supplied from reels 514. Die-cutting or similar modification of the underlayment and the pressure-sensitive adhesive occurs at stations 519 using dies 520. Die-cutting defines apertures (windows) within which cathode 104 and anode 106 can contact separator 102 upon attachment of the underlayment thereto. Exposure of one of the layers of pressure-sensitive adhesive takes place by winding its backing material onto reel 522.

After lamination of the underlayment and pressure-sensitive adhesive to separator 102 at station 505, exposure of the other layer of pressure-sensitive adhesive takes place by winding its backing material onto reels 524. Thereafter, separator 102 and the adhered underlayment pass to station 525, where adhesive bonding to compressible seals 110 and 110' takes place. Station 525 contains rollers 526, which laminate the pressure-sensitive adhesive onto separator 102 to complete the adhesive bonding process. Other bonding techniques can be similarly employed.

Prior to reaching station 525, a roll of a sealing material forming compressible seals 110 and 110' is supplied from reels 528. Die-cutting or similar definition of the sealing material occurs al stations 529 using dies 530. As with the underlayment, die-cutting defines apertures (windows) within which cathode 104 and anode 106 can contact separator 102. The apertures defined at stations 529 are substantially the same size as those defined at stations 511 so that the perimeter-disposed compressible seals 110 and 110' have an underlayment of substantially the same lateral size.

Figure 10A:
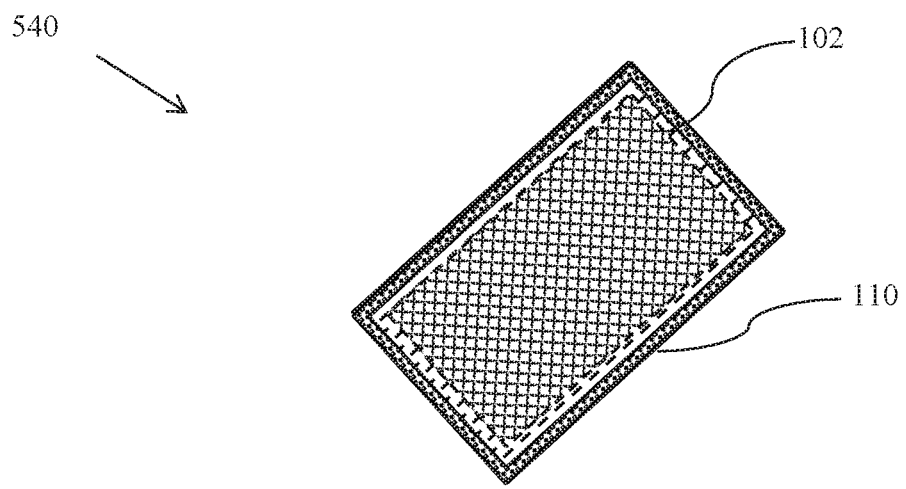
FIGS. 10A and 10B show illustrative top and side-view schematic of the soft goods assembly produced by the production line of FIG. 9.
Figure 10B:
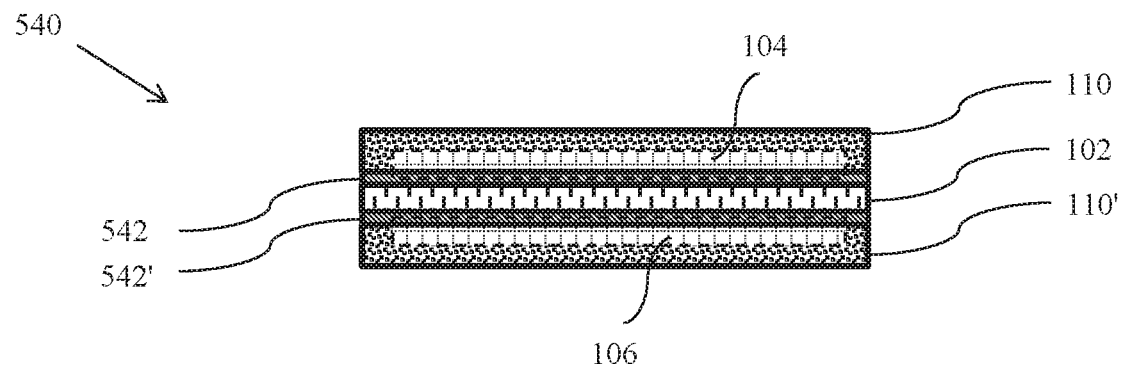
Figure 10C:
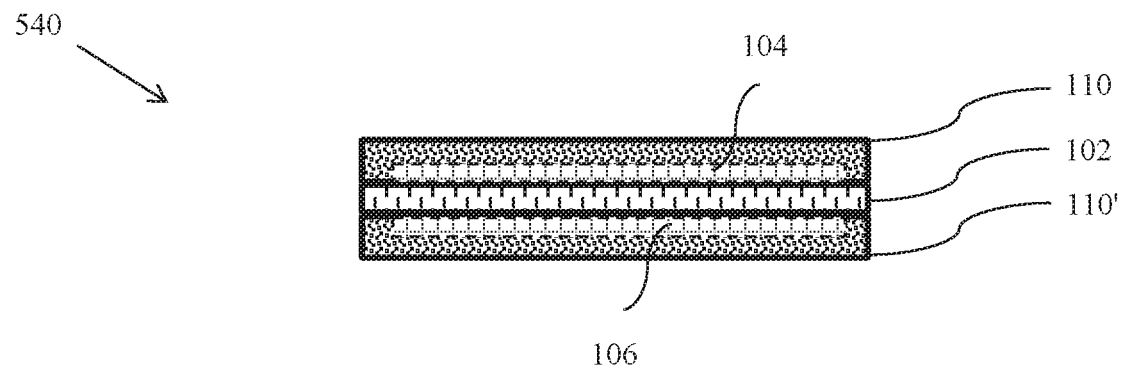
FIG. 10C shows a simplified rendition of FIG. 10B with backing layers being omitted for clarity.

After exiting station 525, the separator-compressible seal laminate passes to station 529, where dies 530 cut the outer perimeter of the separator-compressible seal laminate. This defines the ultimate size of the electrochemical cells, particularly the hard goods that subsequently become attached thereto, as discussed hereinafter. Sheeting of the die-cut separator-compressible seal laminate then takes place at station 531 for further assembly into an electrochemical unit cell or an electrochemical unit cell stack. FIGS. 10A and 10B show illustrative top and side-view schematics of soft goods assembly 540 produced by the production line of FIG. 9, wherein underlayments 542 and 542' intervene between separator and compressible seals 110 and 110', respectively. Additional layers constituting the pressure-sensitive adhesive are not shown in FIGS. 10A and 10B in the interest of clarity. FIG. 10C shows a simplified rendition of FIG. 10B with underlayment 542 and 542' omitted for clarity.

As mentioned above, cathode 104 and anode 106 are usually considered to be part of the soft goods of an electrochemical unit cell. In the interest of simplicity, mechanisms for the placement of cathode 104 and anode 106 have not been depicted in FIG. 9. Illustrative locations in production line 500 where cathode 104 and anode 106 could be introduced from a rolled source material include, for example, just before station 505 or station 525. In FIGS. 10A-10C, cathode 104 and anode 106 are shown disposed in phantom in soft goods assembly 540 to illustrate their positions relative to the other components assembled in production line 500. Incorporation of cathode 104 and anode 106 within an electrochemical unit cell will be discussed in further detail hereinbelow in a unitized process for jointly assembling hard goods and soft goods into an electrochemical unit cell.

Figure 11:
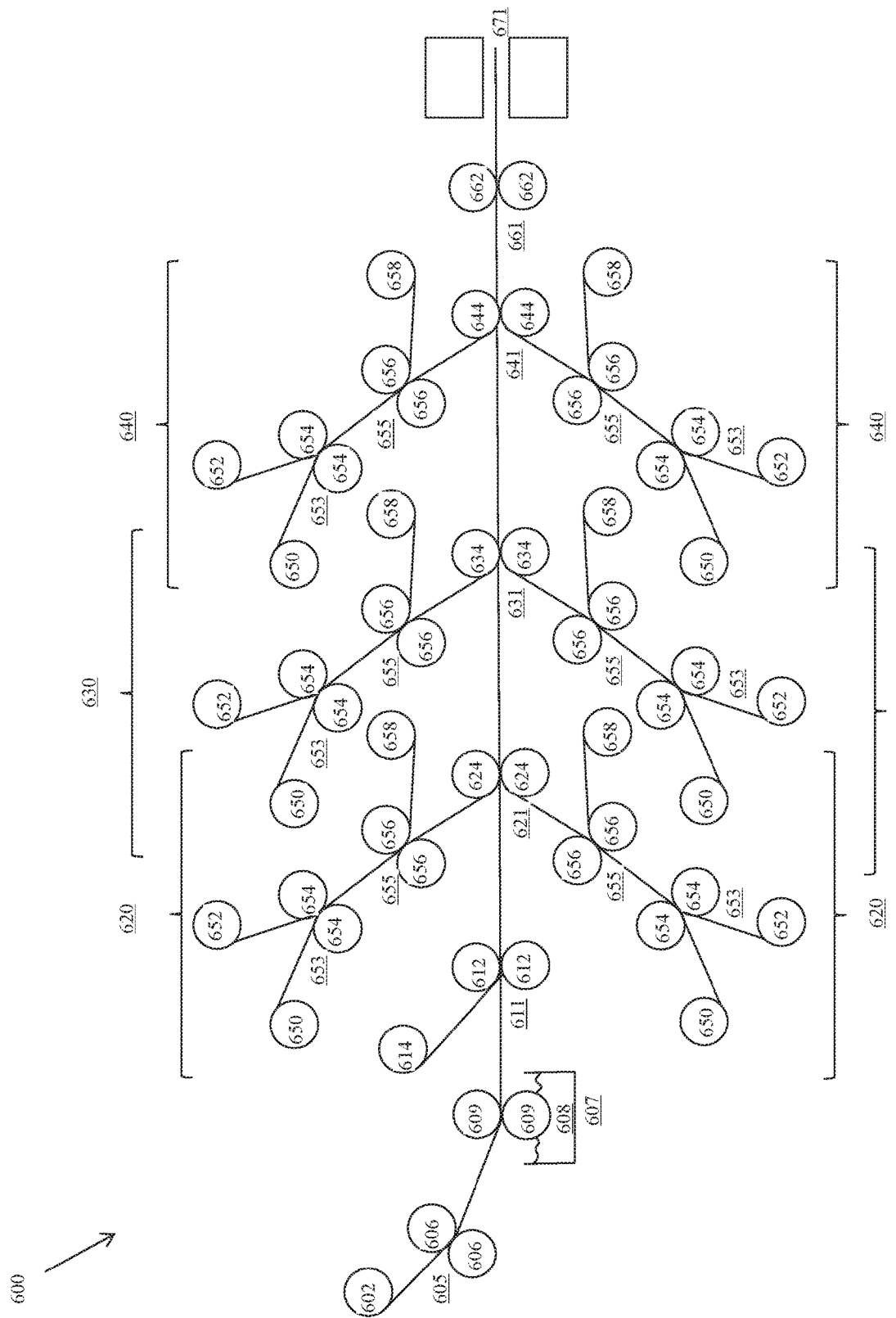
FIG. 11 shows a schematic of an illustrative production line that can combine the hard goods of an electrochemical unit cell in a continuous fashion.

Turning now to the hard goods, FIG. 11 shows a schematic of an illustrative production line that can combine the hard goods of an electrochemical unit cell in a continuous fashion. As depicted in FIG. 11, each of the source materials forming the hard goods are supplied from a rolled source. Again, the source materials, where appropriate, will be referred to by their reference characters from FIGS. 2-8, and FIG. 11 may be better understood by reference to these preceding FIGURES.

More specifically, reel 602 supplies a roll of a material forming frame layer 150 to production line 600. Suitable materials for forming frame layer 150 and the other frame layers are discussed above. The frame layer material is then die-cut or similarly defined at station 605 using dies 606 to form an aperture that ultimately is refilled with bipolar plate 160. Adhesive is be applied at station 607 from bath 608 and rollers 609. Although station 607 is depicted as a gravure-type printing roll, it is to be recognized that in alternative embodiments, the adhesive can be applied by screen printing, spray coating, dip coating, roll coating, slot die coating, and similar deposition techniques. The adhesive-coated material is then passed to station 611 for attachment of bipolar plate 160.

A material forming bipolar plate 160 is supplied from reel 614 and passes to station 611 containing rollers 612. Upon reaching station 611, the bipolar plate material and the adhesive coated frame layer material pass through rollers 612 that result in adherence of the bipolar plate material to the adhesive-coated frame layer. The bipolar plate material occludes the aperture previously defined in the frame layer material at station 605. Various bonding mechanisms can be applied at station 611. In illustrative embodiments, the bipolar plate material can be joined to the adhesive-coated frame layer by cold lamination, hot lamination, UV curing, heat curing, laser welding, ultrasonic welding, and the like. Heat curing, for example, can be applied by passing the bipolar plate material and the frame layer material through a furnace, healing coil, hot air blower, or like thermal source. Choice of a suitable technique to promote adhesive bonding will depend upon the chosen adhesive applied at station 607, and such considerations are considered to lie within the understanding of one having ordinary skill in the art.

After exiting station 611, the frame layer material and its adhered bipolar plate material enter a series of stations in which the material forming frame layers 120, 120', 130, 130', 140 and 140' are added sequentially upon the material forming frame layer 150. Specifically, the materials for frame layers 140 and 140' are applied at station 621, the materials for frame layers 130 and 130' are applied at station 631, and the materials for frame layers 120 and 120' are applied at station 641. Materials for each of the foregoing frame layers applied at stations 621, 631 and 641 are provided from supply arms 620, 630 and 640, each of which operate similarly in supplying the frame layer material, as discussed hereinafter. Stations 621, 631 and 641 respectively contain rollers 624, 634 and 644 that facilitate the lamination process of the various layers to one another.

In brief, supply arms 620, 630 and 640 each contain reels 650 and 652, which supply a frame layer material and a pressure-sensitive adhesive in rolled form. The frame layer material and the pressure-sensitive adhesive undergo lamination at stations 653, which contain rollers 654. After exiting stations 653, the frame layer-adhesive laminate travels to station 655 containing dies 656, where die-cutting takes place to define apertures in the respective frame layers. These apertures ultimately become windows 122, 122', 132, 132', 142 and 142' in the completed electrochemical unit cell. A backing material from one side of the pressure-sensitive adhesive is also removed at station 655 from the outward-facing surface of the pressure-sensitive adhesive and is wound onto roller 658.

Upon exiting station 641, a 7-layer laminate is present (see FIGS. 12A and 12B), which does not include any layers represented by the pressure-sensitive adhesive. The outer perimeter of the 7-layer laminate is then die-cut at station 661 using dies 662. The die-cutting at station 661 is conducted so that the hard goods are complementary in size with the soft goods fabricated in production line 500. As with production line 500, sheeting of the finished hard goods assembly takes place at station 671.

Figure 12A:
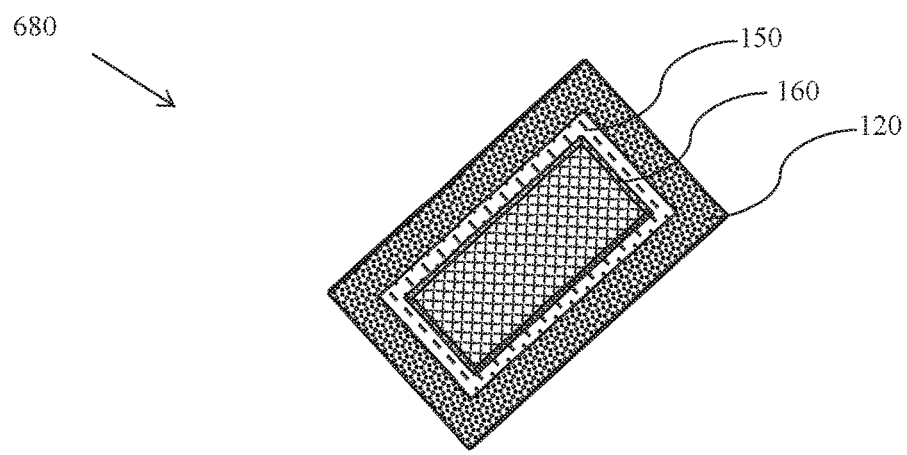
FIGS. 12A and 12B shows illustrative top and side-view schematics of the hard goods assembly fabricated by the product on line of FIG. 11.
Figure 12B:
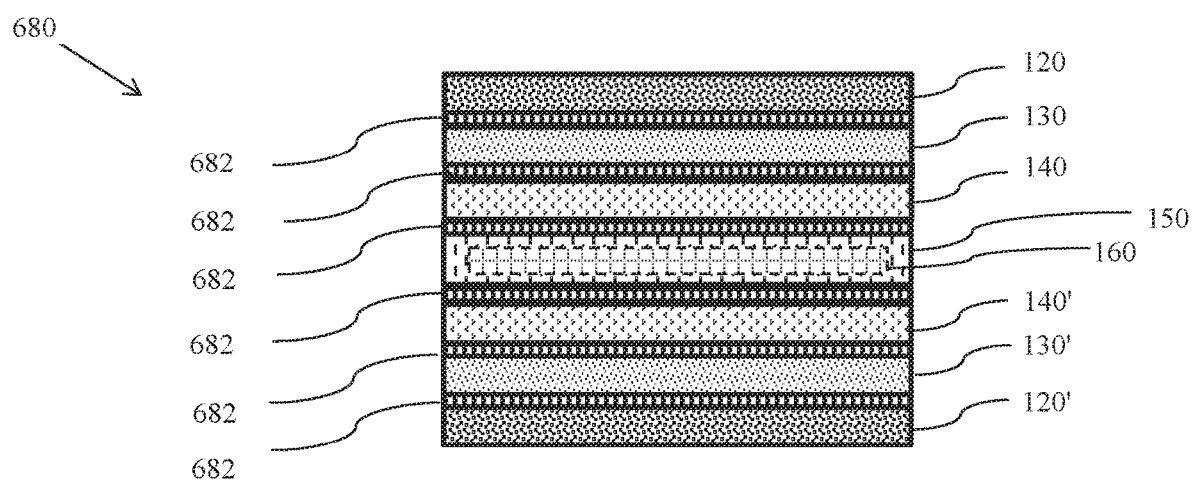
Figure 12C:
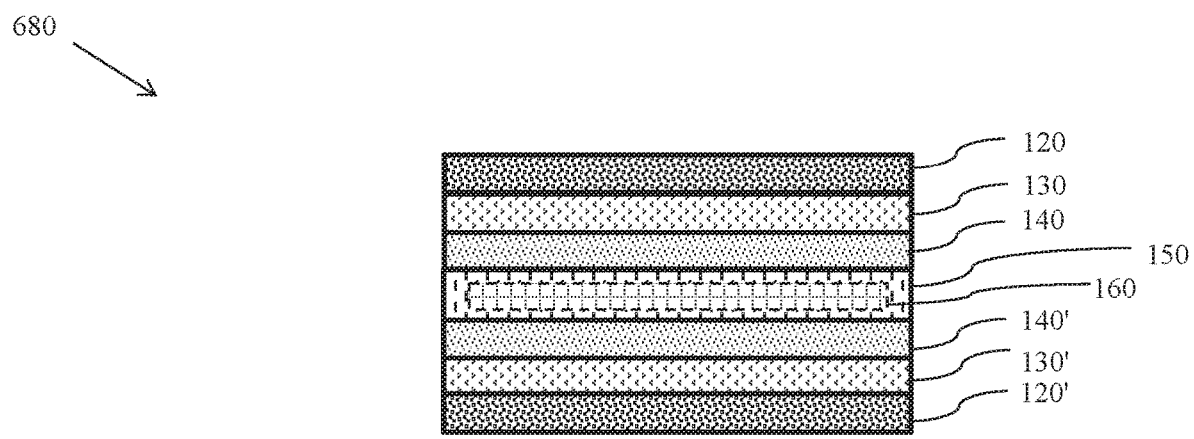
FIG. 12C shows a simplified rendition of the configuration of FIG. 12B with the pressure-sensitive adhesive layers omitted for clarity.

FIGS. 12A and 12B show illustrative top and side-view schematics of hard goods assembly 680 fabricated by the production line of FIG. 11. As shown in FIG. 12A, bipolar plate 160 is adhered to frame layer 150 and occludes the aperture (window) initially defined therein. Overlaying frame layer 150 are successive frame layers 140, 130 and 120, and 140', 130' and 120' (only frame layer 120 visible in FIG. 12A). Each of frame layers 120, 120', 130, 130', 140 and 140' have open apertures, leaving bipolar plate 160 uncovered. The 7-layer laminate structure of hard goods assembly 680 can be seen more clearly in FIG. 12B. As shown in FIG. 12B, frame layer 150 is disposed centrally in the 7-layer laminate and has bipolar plate 160 (shown in phantom) adhered on opposing sides of frame layer 150. Although FIG. 12B has shown bipolar plate 160 (in phantom) as residing solely within frame layer 150, it is to be understood that bipolar plate 160 can also extend through the open apertures in frame layers 120, 130, 140, 120', 130' and 140', as discussed above. Alternately, cathode 104 and anode 106 can extend through the apertures to contact bipolar plate 160. Also on opposing sides of frame layer 150 are successively disposed frame layers 140, 130 and 120, and 140', 130' and 120'. Between each frame layer, pressure-sensitive adhesive layers 682 are also present. Alternative techniques for adhering the various frame layers to one another can also be used FIG. 12C shows a simplified rendition of the configuration of FIG. 12B with pressure-sensitive adhesive layers 682 omitted for clarity.

As mentioned above, additional or fewer frame layers can be included in the electrochemical unit cells of the present disclosure, as dictated by various operational needs. Given the benefit of the present disclosure, one of ordinary skill in the art can readily adapt the production processes described herein to produce a hard goods assembly and corresponding electrochemical unit cell with any number of suitable frame layers.

Figure 13:
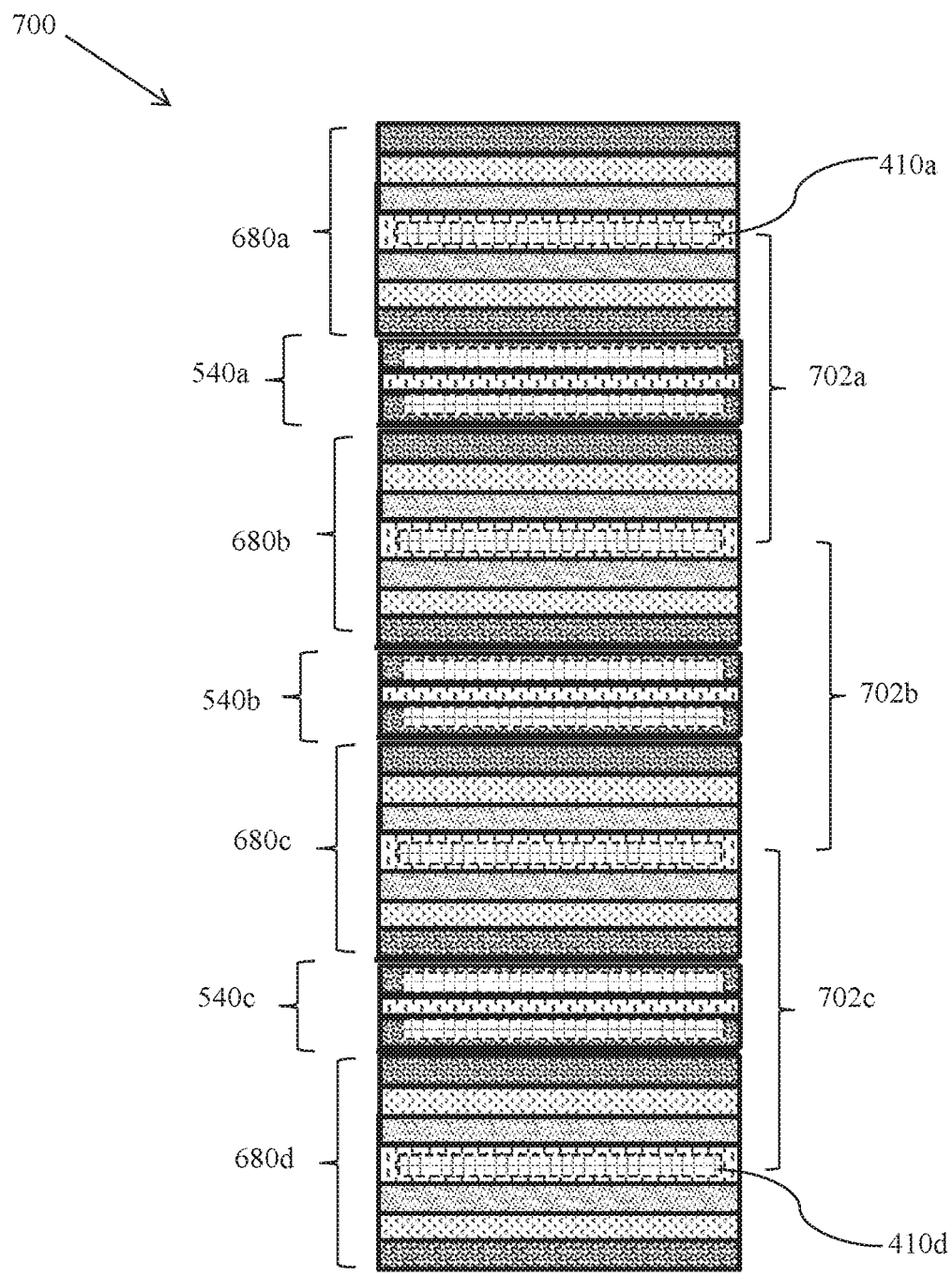
FIG. 13 shows a schematic of an illustrative 3-cell electrochemical stack in which the soft goods assembly of FIGS.

By alternately stacking soft goods assembly 540 and hard goods assembly 680, an electrochemical stack similar to that shown in FIG. 8 can be produced, in which bipolar plate 160 and frame layer 150 are shared between adjacent electrochemical unit cells. FIG. 13 shows a schematic of an illustrative 3-cell electrochemical stack in which the soft goods assembly of FIGS. 10A-10C and the hard goods assembly of FIGS. 12A-12C are stacked in an alternating manner. More particularly, electrochemical stack 700 contains alternating placement of hard goods assembly 680*a-d* and soft goods assembly 540*a-c*, which defines electrochemical unit cells 702*a-c*. Electrochemical unit cells 702*a-c* share bipolar plates in common. Electrochemical unit cells 702*a* and 702*c* at the upper and lower termini of electrochemical stack 700 differ slightly from the configuration depicted in FIG. 8 in that bipolar plates 410*a* and 410*d* do not terminate electrochemical stack 700. Instead, additional frame layers from hard goods assemblies 680*a* and 680*d* terminate electrochemical stack 700 and can be used for mating additional electrochemical cells, if desired. The additional frame layers in hard goods assemblies 680*a* and 680*d* can be terminated with an appropriate part in subsequent manufacturing step. Alternately, hard goods assemblies 680*a* and 680*d* can be manufactured separately with frame layers only on a single side.

Processes for directly producing electrochemical unit cells in a unitized manner by fabricating both a soft goods assembly and a hard goods assembly in a single production line and combining them will now be described in farther detail. Such electrochemical unit cells can have bipolar plates from adjacent electrochemical unit cells abutted against one another in an electrochemical stack, such as the configuration shown in FIG. 7. Contact pressure between the abutted bipolar plates can establish electrical conductivity between the adjacent electrochemical unit cells. A particular advantage of fabricating electrochemical unit cells using the combined production line described hereinafter is that the soft goods assembly is completely sandwiched between two hard goods assemblies upon completion of the manufacturing process, thereby helping to protect the fragile separator therein from damage.

Figure 14:
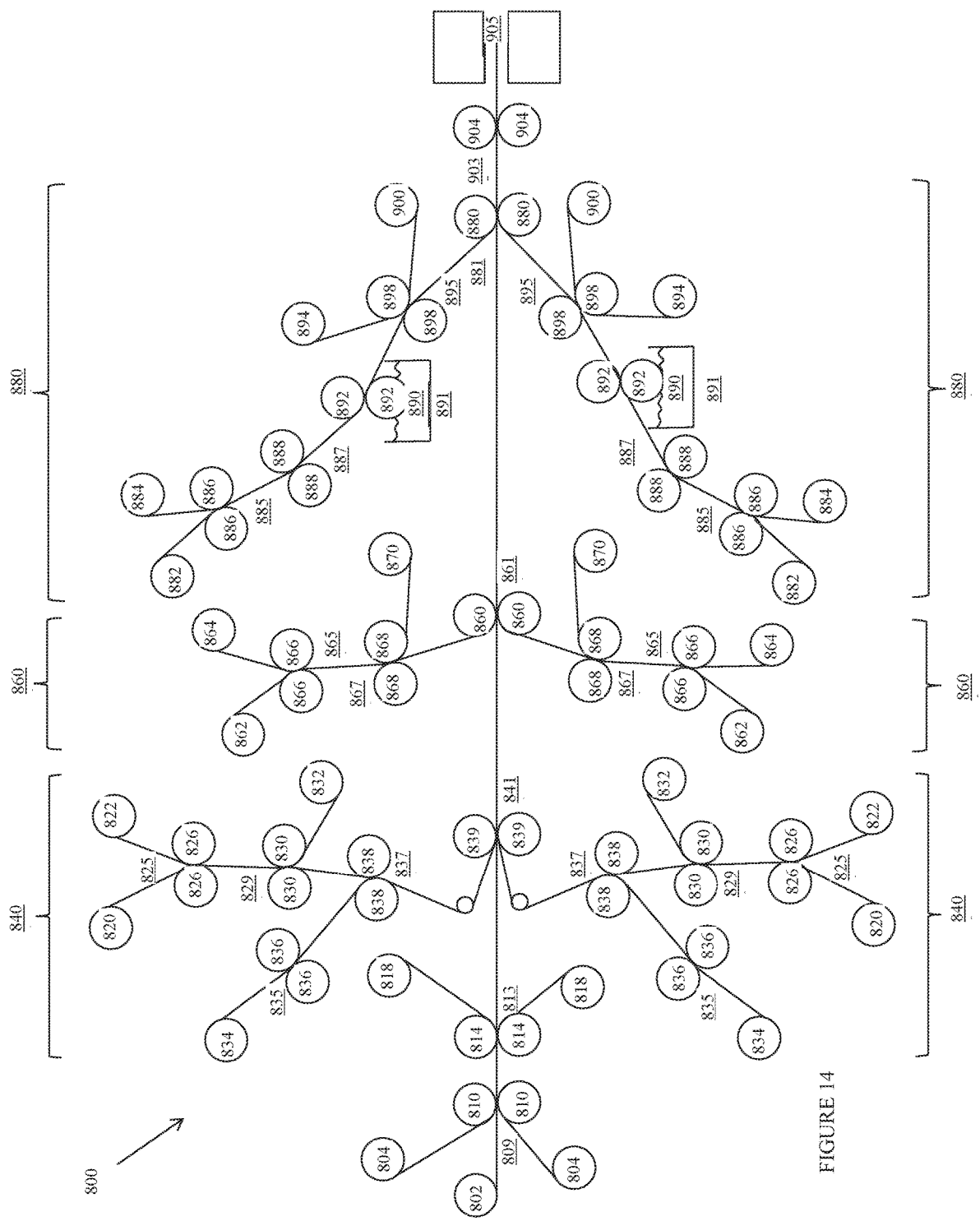
FIG. 14 shows a schematic of an illustrative production line that can produce an electrochemical unit cell in a continuous fashion.

FIG. 14 shows a schematic of an illustrative production line that can produce an electrochemical unit cell in a continuous fashion. As depicted in FIG. 14, each of the source materials forming the soft goods and the hard goods are supplied from a rolled source. Again, the source materials, where appropriate, will be referred to by their reference characters from FIGS. 2-8, and FIG. 14 may be better understood by reference to these preceding FIGURES.

As shown in FIG. 14, reel 802 supplies a roll of separator 102 to production line 800. Reels 804 and 806 similarly supply a roll of materials forming cathode 104 and anode 106. Lamination of cathode 104 and anode 106 to separator 102 takes place a station 809 containing rollers 810. Suitable lamination techniques that can be applied at station 809 include, for example, hot lamination, cold lamination, printing, adhesive bonding (e.g., using a pressure-sensitive adhesive), and the like. Although not shown in FIG. 14, the materials forming cathode 104 and anode 106 can be treated in some manner to facilitate their lamination to separator 102. For example, the edges of cathode 104 and anode 106 can be impregnated with a thermoplastic material to provide a suitable location for pressure-sensitive bonding to occur. Mechanisms similar to those shown in FIG. 9 can be utilized to apply a pressure-sensitive adhesive. Since production line 800 produces an electrochemical unit cell similar to that of FIG. 7, certain differences are present in the soft goods processed in production line 800 compared to those processed in production line 500 in FIG. 9. However, one having ordinary skill in the art can readily understand how production line 500 would be modified to process the soft goods in a manner consistent with FIG. 14. Upon passing the resulting laminate to station 813 which contains dies 814, partial die-cutting of the outer perimeter (e.g., a kiss cut) can lake place to ready the soft goods for further adherence of the hard goods thereto. The scrap material from die-cutting can then be rewound onto reels 818.

The resulting soft goods assembly leaving station 813 can then have the various layers of the hard goods assembly applied at stations 841, 861 and 881 using materials received from supply arms 840, 860 and 880, respectively. Each of these lamination operations are described in further detail below.

Supply arm 840 provides materials for forming frame layers 120 and 120' from reels 820. A pressure-sensitive adhesive is unwound from reels 822 and undergoes lamination to the frame layer material at stations 825, which contain rollers 826. The resulting laminate passes to stations 829 for die-cutting with dies 830. Die-cutting defines apertures in the frame layer material which ultimately becomes windows 122 and 122'. The exposed backing layer of the pressure-sensitive adhesive is then removed and can be rewound on reel 832.

Supply arm 840 also provides materials for forming frame layers 130 and 130' from reels 834, and die-cutting of this material subsequently takes place at stations 835 using dies 836. Die-cutting defines apertures that ultimately become windows 132 and 132'. Lamination of the die-cut material of frame layers 130 and 130' to the exposed pressure-sensitive adhesive on frame layers 120 and 120' then takes place at stations 837 containing rollers 838. The resulting laminate of frame layers 120, 120', 130 and 130' then progresses to station 841 and undergoes lamination to the soft goods assembly using rollers 839. Alternately, the materials for forming frame layers 120 and 120' can be laminated to the soft goods assembly separately from that of frame layers 130 and 130', in which case the materials for frame layers 130 and 130' can be provided from a separate supply arm.

Supply arm 860 provides materials for forming frame layers 140 and 140'. Supply arm 860 is substantially similar to that of supply arm 630 in FIG. 11 and will be described only in brief as a result. Namely, supply arm 860 contain reels 862 and 864, which respectively provide a frame layer material and a pressure-sensitive adhesive in rolled form. The frame layer material and the pressure-sensitive adhesive undergo lamination at stations 865, which contains rollers 866. After exiting stations 865, the resulting laminate of the frame layer material and pressure-sensitive adhesive travels to station 867, where die-cutting with dies 868 defines apertures which ultimately become windows 142 and 142' and flow channels 144 and 144' within frame layers 140 and 140'. The backing layer for the pressure-sensitive adhesive is then removed and can be rewound at reel 870. Thereafter, the frame layer material undergoes lamination to the frame layers 130 and 130' at station 861 containing rollers 860.

Supply arm 880 provides materials for forming frame layers 150 and 150' and bipolar plates 160 and 160'. Namely, supply arm 880 contains reels 882 and 884, which respectively provide a frame layer material and a pressure-sensitive adhesive in rolled form. The frame layer material and the pressure-sensitive adhesive undergo lamination at stations 885, which contains rollers 886. After exiting stations 886, the resulting laminate of the frame layer material and pressure-sensitive adhesive travels to station 887, where die-cutting with dies 888 defines apertures that ultimately become windows 152 and 152' within frame layers 150 and 150'. Adhesive is then applied at station 891 from bath 890 and rollers 892. As discussed above in reference to FIG. 11, adhesive can also be applied to the frame layer material in other manners as well. The adhesive-coated material is then passed to station 895 for attachment of bipolar plates 160 and 160'.

Materials for forming bipolar plates 160 and 160 are supplied from reels 894 and pass to station 895. Upon reaching station 895, the bipolar plate material and the adhesive-coated frame layer material from station 891 pass through rollers 898 that result in adherence of the bipolar plate material to the adhesive-coated frame layer. The bipolar plate material occludes the apertures (i.e., windows 152 and 152) that where previously defined in the frame layer material at station 887. Various bonding techniques can be applied at station 895, such as those discussed above in reference to FIG. 11.

The backing layer for the pressure-sensitive adhesive is then removed and can be rewound at reel 900. Afterward, the resulting laminate of the frame layer material and the adhesively bonded bipolar plate material progress to station 881 containing rollers 880 for lamination to frame layers 140 and 140'. Die-cutting can then take place at station 903 using dies 904 to define a completed electrochemical unit cell, similar to that shown in FIG. 6. Sheeting of the finished electrochemical unit cells can then take place at station 905.

Although FIG. 14 has shown the continuous production of a single electrochemical cell, it is to be recognized that additional soft goods assemblies and hard goods assemblies can be incorporated into a single production line to fabricate electrochemical stacks having more than one electrochemical unit cell. For example, multiple production lines 800 can operate in parallel, and the finished electrochemical units cells exiting each production line can be autonomously abutted together to form an electrochemical cell stack. Alternately, production line 800 can be further modified to stack individual electrochemical unit cells upon one another without resorting to multiple production lines. Still further alternately, multiple electrochemical unit cells can be laminated to one another by stacking individual electrochemical unit cells upon one another in a manual, automated, or semi-automated fashion outside a continuous production line environment. Suitable techniques for adhering the adjacent electrochemical unit cells to one another can include, for example, adhesive bonding, layer welding, hot pressing, ultrasonic welding, mechanical fastening, and the like. Alternately, the adjacent electrochemical unit cells in an electrochemical stack can be compressed with one another without becoming adhered together.

The flow batteries incorporating electrochemical unit cells of the present disclosure are, in some embodiments, suited to sustained charge or discharge cycles of several hour durations. As such, they can be used to smooth energy supply/demand profiles and provide a mechanism for stabilizing intermittent power generation assets (e.g., from renewable energy sources such as solar and wind energy). It should be appreciated, then, that various embodiments of the present disclosure include energy storage applications where such long charge or discharge durations are desirable. For example, in non-limiting examples, the flow batteries can be connected to an electrical grid to allow renewables integration, peak load shifting, grid firming, baseload power generation and consumption, energy arbitrage, transmission and distribution asset deferral, weak grid support, frequency regulation, or any combination thereof. When not connected to an electrical grid, the flow batteries can be used as power sources for remote camps, forward operating bases, off-grid telecommunications, remote sensors, the like, and any combination thereof. Further, it is to be appreciated that electrochemical energy storage media other than flow batteries can also incorporate the electrochemical unit cells disclosed herein, including those utilizing stationary electrolyte solutions.

In additional embodiments, electrochemical unit cells, electrochemical cell stacks, and flow batteries of the present disclosure can be incorporated into larger energy storage systems, suitably including piping and controls useful for operation of these large units. Piping, control, and other equipment suitable for such systems are known in the art, and can include, for example, piping and pumps in fluid communication with the respective chambers for moving electrolyte solutions into and out of the cells and storage tanks for holding charged and discharged electrolytes. An operation management system can also be present. The operation management system can be any suitable controller device, such as a computer or microprocessor, and can contain logic circuitry that sets operation of any of the various valves, pumps, circulation loops, and the like.

Where not otherwise defined hereinabove or understood by one having ordinary skill in the art, the definitions in the following paragraphs will be applicable to the present disclosure.

As used herein, the term "energy density" will refer to the amount of energy that can be stored, per unit volume, in the active materials. Energy density refers to the theoretical energy density of energy storage and can be calculated by Equation 1:

$$\text{Energy density}=(26.8 A\text{-}h/\text{mol})\times OCV\times[e^-] \quad (1)$$

where OCV is the open circuit potential at 50% state of charge, (26.8 A-h/mol) is Faraday's constant, and $[e^-]$ is the concentration of electron stored in the active material at 99% state of charge. In the case that the active materials largely are an atomic or molecular species for both the positive and negative electrolyte, $[e^-]$ can be calculated by Equation 2 as:

$$[e^-]=[\text{active materials}]\times N/2 \quad (2)$$

where [active materials] is the molar concentration of the active material in either the negative or positive electrolyte, whichever is lower, and N is the number of electrons transferred per molecule of active material. The related term "charge density" refer to the total amount of charge that each electrolyte contains. For a given electrolyte, the charge density can be calculated by Equation 3

$$\text{Charge density}=(26.8 A\text{-}h/\text{mol})\times[\text{active material}]\times N \quad (3)$$

where (active material) and N are as defined above.

As used herein, the term "current density" will refer to the total current passed in an electrochemical cell divided by the geometric area of the electrodes of the cell and is commonly reported in units of $mA/cm^2$.

As used herein, the term "current efficiency" ($I_{eff}$) can be described as the ratio of the total charge produced upon discharge of a cell to the total charge passed during charging. The current efficiency can be a function of the state of charge of the flow battery. In some non-limiting embodiments, the current efficiency can be evaluated over a state or charge range of about 35% to about 60%.

As used herein, the term "voltage efficiency" can be described as the ratio of the observed electrode potential, at a given current density, to the half-cell potential for that electrode (×100%). Voltage efficiencies can be described for a battery charging step, a discharging step, or a "round trip voltage efficiency." The round trip voltage efficiency ($V_{eff,RT}$) at a given current density can be calculated from the cell voltage at discharge ($V_{discharge}$) and the voltage at charge ($V_{charge}$) using equation 4:

$$V_{eff,RT}=V_{discharge}/V_{charge}\times 100\% \quad (4)$$

As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to a reversible hydrogen electrode. The negative electrode is associated with a first electrolyte solution and the positive electrode is associated with a second electrolyte solution, as described herein. The electrolyte solutions associated with the negative and positive electrodes may be described as negolytes and posolytes, respectively.

Although the disclosure has been described with reference to the disclosed embodiments, those skilled in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed:

1. A method comprising:
supplying rolls of a separator material, a cathode material, and an anode material to a production line;
adhering the cathode material and the anode material on opposing sides of the separator material at a first location in the production line, thereby forming a soft goods assembly;
supplying rolls of a first insulator material and a second insulator material to the production line;
defining windows within the first insulator material and the second insulator material in the production line, adhering first and second frame layers comprising the first insulator material on opposing sides of the soft goods assembly in the production line, and adhering a third frame layer onto the first frame layer and a fourth frame layer onto the second frame layer in the production line, the third frame layer and the fourth frame layer comprising the second insulator material;
supplying rolls of a third insulator material to the production line;
defining windows within the third insulator material in the production line, and adhering a fifth frame layer onto the third frame layer and a sixth frame layer onto the fourth frame layer in the production line, the fifth frame layer and the sixth frame layer comprising the third insulator material;
supplying rolls of a fourth insulator material and a bipolar plate material to the production line; and
defining windows within the fourth insulator material in the production line, adhering the bipolar plate material to the fourth insulator material in the production line such that the windows in the fourth insulator material are occluded by the bipolar plate material, and
adhering a seventh frame layer to the fifth frame layer and an eighth frame layer to the sixth frame layer in the production line, the seventh frame layer and the eighth frame layer comprising the fourth insulator material, thereby defining an electrochemical unit cell;
wherein the windows within the first insulator material, the second insulator material and third insulator material overlay one another when disposed as the first, second, third, fourth, fifth and sixth frame layers; and
wherein the bipolar plate material contacts the cathode material and the anode material on opposing sides of the soft goods assembly.

2. The method of claim 1, further comprising:
adhering the first insulator material and the second insulator material to one another before adhering the first frame layer and the second frame layer onto the soft goods assembly.

3. The method of claim 1, wherein the cathode material and the anode material are adhered to the separator material using a pressure-sensitive adhesive.

4. The method of claim 1, wherein each of the frame layers are collectively adhered to one another.

5. The method of claim 1, further comprising:
connecting a plurality of the electrochemical unit cells together with one another in series;
wherein adjacent electrochemical unit cells within the electrochemical stack have a bipolar plate from a first electrochemical unit cell abutted together with a bipolar plate from a second electrochemical unit cell.

6. A method of fabricating a bipolar plate module for electrical communication with an electrochemical cell, comprising:
supplying a roll of a first insulator material to a production line; defining windows within the first insulator material in the production line;
supplying a roll of a bipolar plate material to the production line;
adhering the bipolar plate material to the first insulator material in the production line such that the windows in the first insulator material are occluded by the bipolar plate material;
supplying rolls of a second insulator material to the production line; defining windows within the second insulator material in the production line and adhering the second insulator material on opposing sides of the first insulator material;
supplying rolls of a third insulator material to the production line;
defining windows within the third insulator material in the production line and adhering the third insulator material to the second insulator material on opposing sides of the first insulator material;
supplying rolls of a fourth insulator material to the production line; and
defining windows within the fourth insulator material in the production line and adhering the fourth insulator material to the third insulator material on opposing sides of the first insulator material.

7. The method of claim 1, wherein the separator material comprises an ionically conductive polymer.

8. The method of claim 1, wherein at least one of cathode and anode comprise carbon felt.

9. The method of claim 1, wherein at least one of the first, second, third and fourth insulator material comprises polyolefin material.

10. The method of claim 9, wherein the polyolefin material comprises polyethylene.

11. The method of claim 1, wherein at least one frame window is formed by die-cutting, laser cutting or stamping.

12. The method of claim 1, wherein at least one frame adhering step is accomplished by use of pressure sensitive adhesive, heat-curable adhesive, or UV-curable adhesive.

13. The method of claim 6, wherein the bipolar plate material comprises flexible graphite foil, expanded graphite, metal film, foil or metal sheet.

14. The method of claim 6, wherein at least one of the first, second, third and fourth insulator material comprises polyolefin material.

* * * * *